(12) United States Patent
Iida et al.

(10) Patent No.: US 6,733,350 B2
(45) Date of Patent: May 11, 2004

(54) ENGINE OUTPUT CONTROL FOR WATERCRAFT

(75) Inventors: Kazumi Iida, Shizuoka (JP); Masaki Takegami, Shizuoka (JP); Shigeharu Mineo, Shizuoka (JP); Shigeyuki Ozawa, Shizuoka (JP); Mitsuyoshi Nakamura, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/813,465

(22) Filed: Mar. 19, 2001

(65) Prior Publication Data

US 2001/0036777 A1 Nov. 1, 2001

(30) Foreign Application Priority Data

Mar. 17, 2000 (JP) ........................................ 2000-077084
Feb. 6, 2001 (JP) ........................................ 2001-029961

(51) Int. Cl.⁷ .............................................. B60K 41/00
(52) U.S. Cl. ........................................ 440/84; 440/87
(58) Field of Search ............................ 440/1, 2, 84, 87, 440/38; 114/144 R

(56) References Cited

U.S. PATENT DOCUMENTS

| | | |
|---|---|---|
| 1,843,272 A | 2/1932 | Evinrude |
| 2,332,697 A | 10/1943 | Claytor |
| 2,627,836 A | 2/1953 | Buske |
| 2,682,248 A | 6/1954 | Sitz |
| 3,002,487 A | 10/1961 | Didsbury, Sr. |
| 3,135,234 A | 6/1964 | Turnidge |
| 3,795,105 A | 3/1974 | Aschauer |
| 3,918,256 A | 11/1975 | Ashleman |
| 4,100,877 A | 7/1978 | Scott et al. |
| 4,767,363 A | 8/1988 | Uchida et al. |
| 4,778,414 A | 10/1988 | Taguchi |
| 4,836,809 A | 6/1989 | Pelligrino |
| 4,938,721 A | 7/1990 | Koike |
| 4,976,636 A | 12/1990 | Torigai et al. |
| 5,062,815 A | 11/1991 | Kobayashi |
| 5,065,723 A | 11/1991 | Broughton et al. |
| 5,074,810 A | 12/1991 | Hobbs et al. |
| 5,127,858 A | 7/1992 | Pelligrino et al. |
| 5,142,473 A | 8/1992 | Davis |
| 5,203,727 A | 4/1993 | Fukui |
| 5,261,844 A | 11/1993 | Shibata |
| 5,273,016 A | 12/1993 | Gillespie et al. |
| 5,280,282 A | 1/1994 | Nagafusa et al. |
| 5,314,362 A | 5/1994 | Nagahora |
| 5,368,510 A | 11/1994 | Richard |
| 5,389,016 A | 2/1995 | Nestvall |
| 5,413,461 A | 5/1995 | Johnsen |
| 5,492,493 A | 2/1996 | Ohkita |
| 5,538,449 A | 7/1996 | Richard |
| 5,582,125 A | 12/1996 | Matsumoto |
| 5,586,535 A | 12/1996 | Syomura |
| 5,607,332 A | 3/1997 | Kobayashi et al. |
| 5,665,025 A | 9/1997 | Katoh |
| 5,666,917 A * | 9/1997 | Fraser et al. ........... 123/339.11 |
| 5,755,601 A | 5/1998 | Jones |
| 5,797,371 A | 8/1998 | Nonaka |
| 5,809,436 A | 9/1998 | Gregory |
| 5,833,501 A | 11/1998 | Jones |

(List continued on next page.)

FOREIGN PATENT DOCUMENTS

CA 2207938 7/1998

*Primary Examiner*—Ed Swinehart
(74) *Attorney, Agent, or Firm*—Knobbe, Martens, Olson & Bear, LLP

(57) ABSTRACT

A watercraft includes an improved engine control system that enhances the responsiveness of the watercraft and eases watercraft operation. The watercraft includes a propulsion device, such as a jet propulsion unit, and an engine that powers the propulsion device. The engine control system is configured to maintain or increase engine speed under certain operating conditions.

40 Claims, 15 Drawing Sheets

U.S. PATENT DOCUMENTS

| | | |
|---|---|---|
| 5,868,118 A | 2/1999 | Yoshioka |
| 5,906,524 A | 5/1999 | Ozawa et al. |
| 6,015,317 A | 1/2000 | Hoshiba et al. |
| 6,015,319 A | 1/2000 | Tanaka |
| 6,024,068 A | 2/2000 | Nakase et al. |
| 6,030,261 A | 2/2000 | Motose |
| 6,159,059 A | 12/2000 | Bernier et al. |
| 6,336,833 B1 * | 1/2002 | Rheault et al. ........ 440/1 |

* cited by examiner

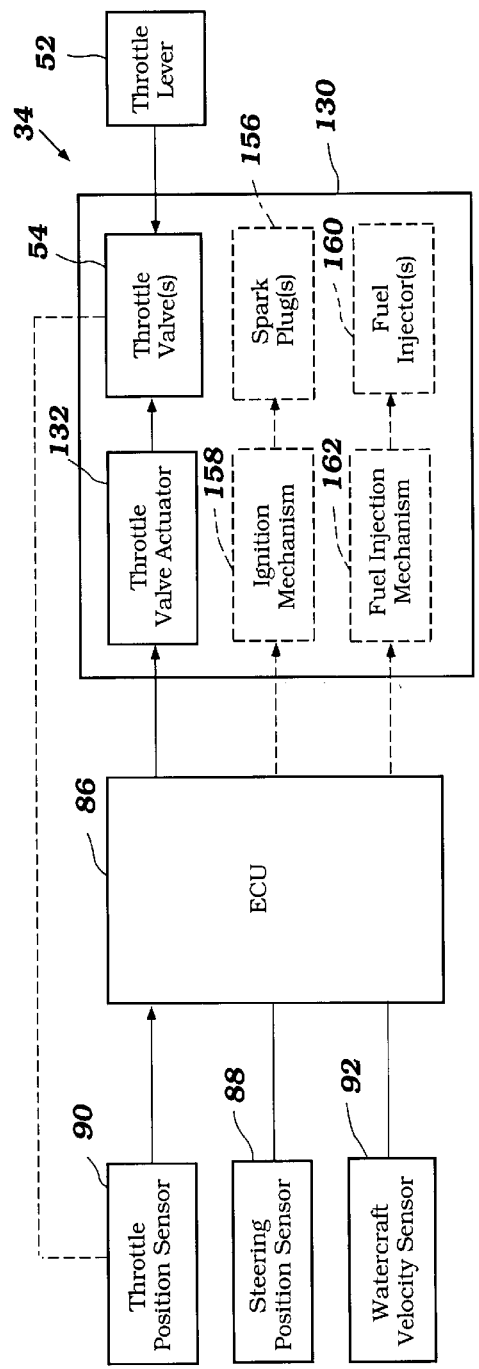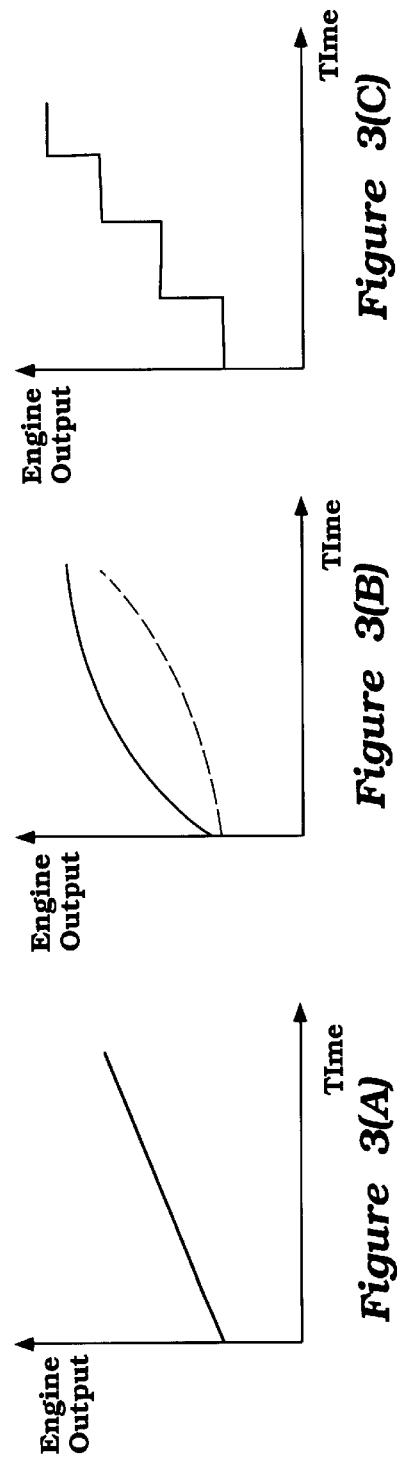
Figure 2
Figure 3(A)
Figure 3(B)
Figure 3(C)

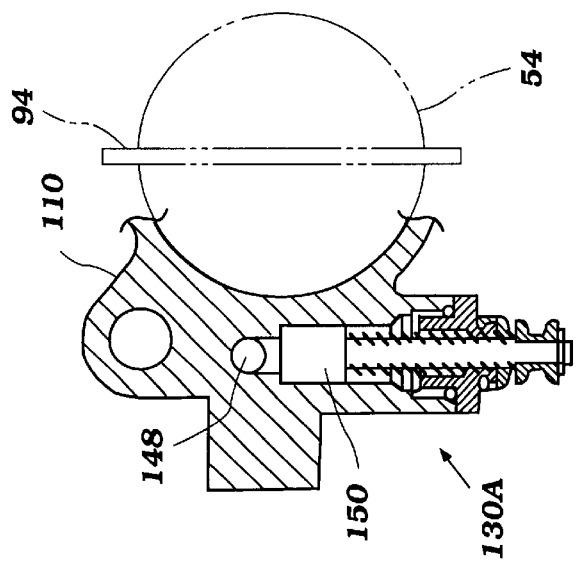
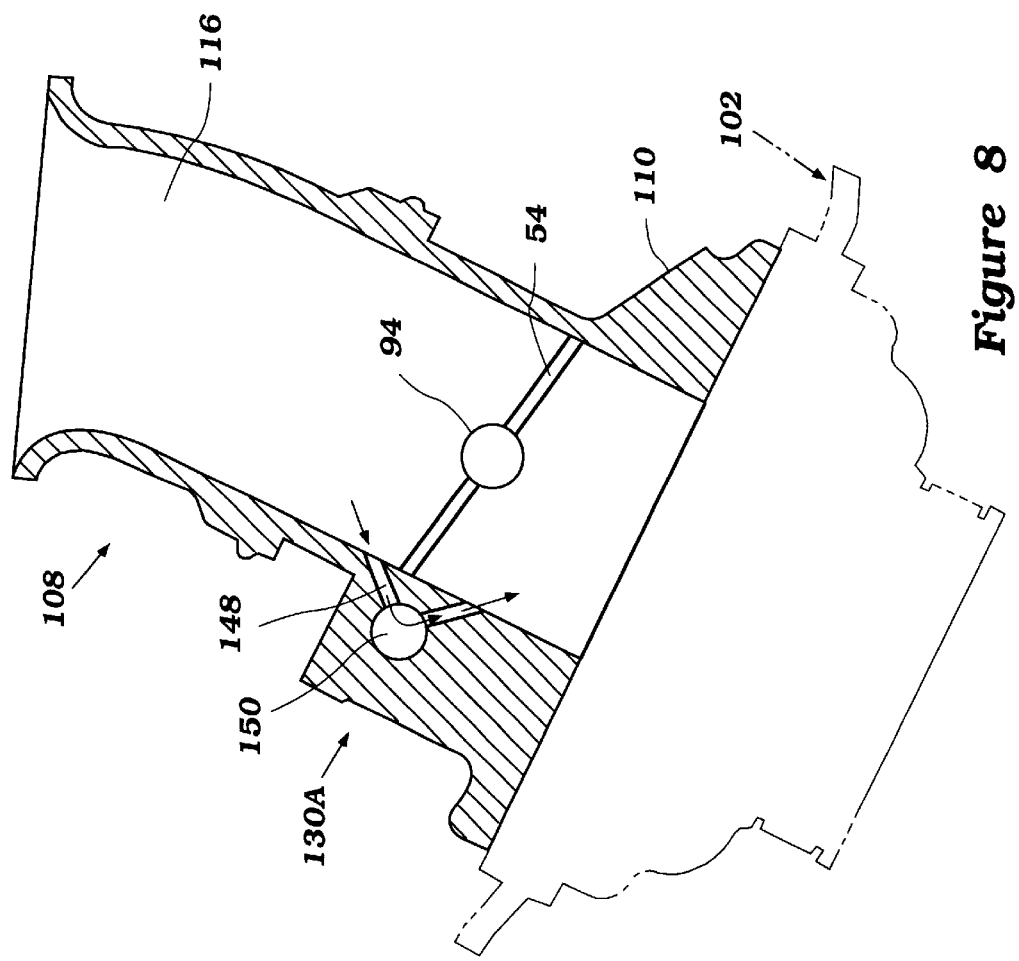

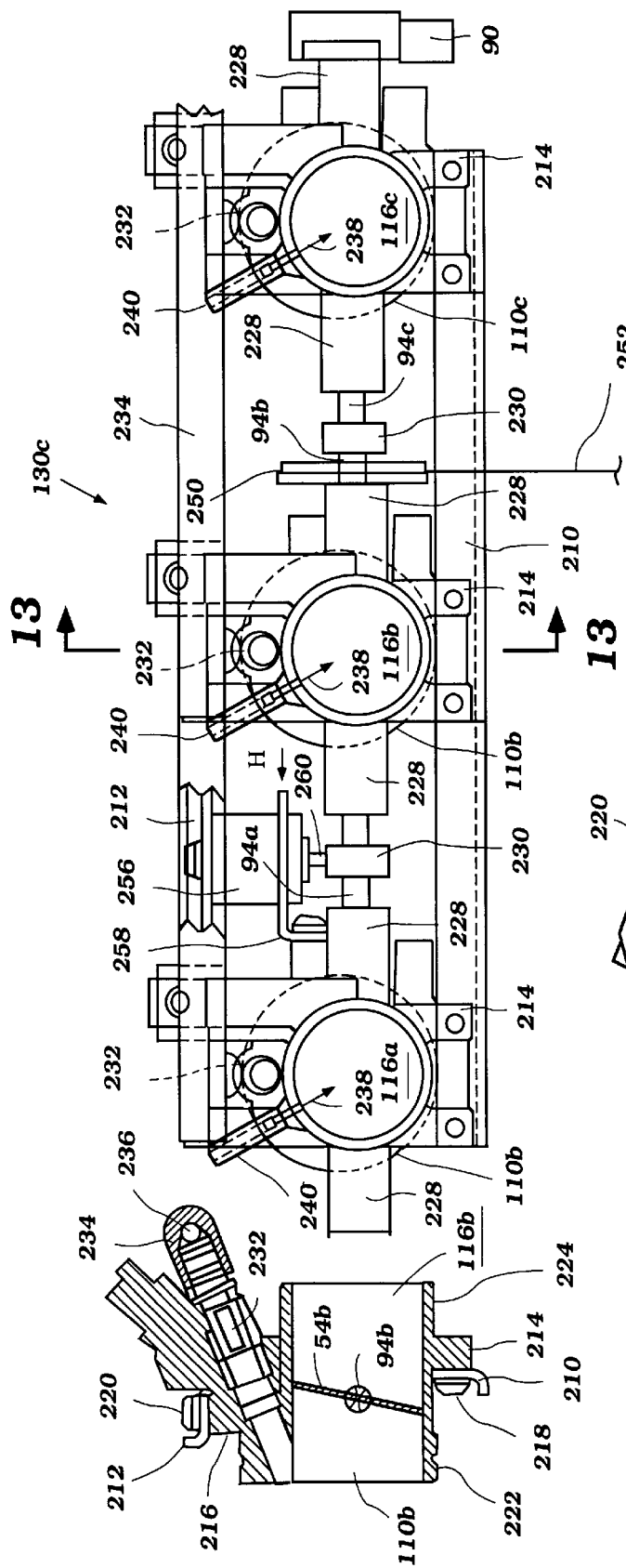
*Figure 13 (A)*
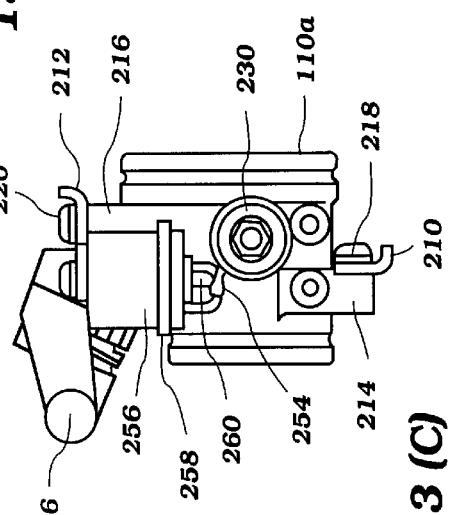
*Figure 13 (C)*
*Figure 13 (B)*

ENGINE OUTPUT CONTROL FOR WATERCRAFT

PRIORITY INFORMATION

This invention is based on and claims priority to Japanese Patent Application Nos. 20000-77084 and 2001-029961, filed Mar. 17, 2000 and Feb. 6, 2001, respectively, the entire contents of which are hereby expressly incorporated by reference.

BACKGROUND OF THE INVENTION

1. Field of the Invention

This invention relates to a control system for an engine of a watercraft.

2. Description of Related Art

Personal watercraft have become very popular in recent years. This type of watercraft is quite sporting in nature and carries one or more riders. A hull of the personal watercraft commonly defines a rider's area above an engine compartment. An internal combustion engine powers a jet propulsion unit that propels the watercraft by discharging water rearward. The engine lies within the engine compartment in front of a tunnel, which is formed on an underside of the hull. The jet propulsion unit is placed within the tunnel and includes an impeller that is driven by the engine.

A deflector or steering nozzle is mounted on a rear end of the jet propulsion unit for steering the watercraft. A steering mast with a handlebar is linked with the deflector through a linkage. The steering mast extends upwardly in front of the rider's area. The rider remotely steers the watercraft using the handlebar.

The engine typically includes a throttle valve disposed in an air intake passage of the engine. The throttle valve regulates an air amount supplied to the engine. Typically, as the amount of air increases, the engine output also increases. A throttle lever or control is attached to the handlebar and is linked with the throttle valve usually through a throttle linkage and cable. The rider thus can control the throttle valve remotely by operating the throttle lever on the handlebar.

When docking, the rider operates the handlebar to make a right or left turn toward the dock. Under some conditions, the rider may have a little difficulty in slowly guiding the watercraft into a docking position. A need therefore exists for an improved engine output control for a watercraft that can enhance maneuverability of the watercraft under at least slow speed conditions.

SUMMARY OF THE INVENTION

In accordance with one aspect of the present invention, a watercraft comprises a water propulsion device and an engine powering the water propulsion device. An engine output control mechanism is arranged to control the engine's output. A steering mechanism is arranged to the watercraft. A first sensor is arranged to sense a state of the engine output control mechanism. A second sensor is arranged to sense a state of the steering mechanism. A control device is configured to control the engine output control mechanism based upon a first control parameter corresponding to an output of the first sensor and a second control parameter corresponding to an output of the second sensor. The control device causes the engine output control mechanism to increase the engine output when the first control parameter is less than a first reference magnitude and the second control parameter is greater than a second reference magnitude.

In accordance with another aspect of the present invention, a watercraft comprises a water propulsion device and an engine powering the water propulsion device. An engine output control mechanism is arranged to control the engine's output. A steering mechanism is arranged to steer the watercraft. A first sensor is arranged to sense a state of the steering mechanism. A second sensor is arranged to sense a velocity of the watercraft. A control device is configured to control the engine output control mechanism based upon a first control parameter corresponding to an output of the first sensor and a second control parameter corresponding to an output of the second sensor. The control device causes the engine output control mechanism to increase the engine output when the first control parameter is greater than a first reference magnitude and the second control parameter is greater than a second reference magnitude.

In accordance with a further aspect of the present invention, a watercraft comprises a water propulsion device and an engine powering the water propulsion device. A steering mechanism is arranged to steer a thrust direction of the water propulsion device. The thrust direction is quickly changed under a first condition when the water propulsion device produces a thrust force greater than a predetermined thrust force. Means are provided for recognizing that the steering mechanism is steered under a second condition in which the water propulsion device does not produce a thrust force greater than the predetermined thrust force. Additional means are provided for increasing an output of the engine when the recognizing means recognizes that the steering mechanism is steered under the second condition.

In accordance with a further aspect of the present invention, a watercraft comprises a water propulsion device and an engine powering the water propulsion device. The engine has at least one combustion chamber and an air induction system arranged to provide air to the combustion chamber. A throttle valve is disposed in the air induction system for regulating an amount of the air flowing into the combustion chamber. A steering assembly is arranged to steer the watercraft. A first sensor is arranged to sense an opening degree of the throttle valve. A second sensor is arranged to sense an angular position of the steering assembly. An electrically operated control device is provided. A throttle valve actuator is arranged to operate the opening degree of the throttle valve. The control device is configured to control the throttle valve actuator based upon an output of the first sensor and an output of the second sensor. The control device causes the throttle valve actuator to operate the throttle valve to increase the opening degree when the output of the first sensor indicates that the sensed opening degree less than a reference opening degree and the output of the second sensor indicates that the sensed angular position is greater than a reference angular position.

In accordance with an additional aspect of the present invention, a control method is provided for an engine of a watercraft. The watercraft has a water propulsion device, an engine output control mechanism, a steering mechanism, at least two sensors and a control device. The method comprises sensing a state of the engine output control mechanism by one sensor, sensing a state of the steering mechanism by another sensor, determining whether a first control parameter corresponding to a sensed state of the engine output is less than a first reference magnitude, determining whether a second control parameter corresponding to a sensed state of the steering mechanism is greater than a second reference magnitude, and increasing engine output by the control device if the results of both determinations are affirmative (i.e., are true).

In accordance with a still another aspect of the present invention, a control method is provided for an engine of a watercraft. The watercraft has a water propulsion device, a steering assembly, at least two sensors and a control device. The engine includes a throttle valve and a throttle valve actuator. The method comprises sensing an opening degree of the throttle valve by one sensor, sensing an angular position of the steering assembly by another sensor, determining whether the sensed opening degree is less than a reference opening degree, determining whether the sensed angular position is greater than a reference angular position, and increasing the opening degree by the control device if the results of both determinations are affirmative (i.e., are true).

Further aspects, features and advantages of this invention will become apparent from the detailed description of the preferred embodiments which follow.

BRIEF DESCRIPTION OF THE DRAWINGS

These and other features, aspects and advantages of the present invention will now be described with reference to the drawings of preferred embodiments, which are intended to illustrate and not to limit the invention. The drawings comprise 23 figures.

FIG. 2 is a block diagram showing the control system of an engine for the watercraft.

FIG. 3(A) is a graph showing a way of increase of an engine output versus time. FIG. 3(B) is a graph showing another way of increase of the engine output versus time. FIG. 3(C) is a graph showing a further way of increase of the engine output versus time.

FIG. 8 is a sectional view of an air intake conduit having the throttle valve and a bypass. A portion of the engine where the intake conduit is connected is also shown in phantom.

FIG. 9 is a sectional view of a bypass control mechanism. The intake passage in part and the throttle valve is shown in phantom.

FIG. 13(A) is a side view of an additional throttle valve control mechanism configured in accordance with an additional preferred embodiment of the present invention. FIG. 13(B) is a sectional view of the throttle valve control mechanism taken along the line 13—13 of FIG. 13(A). FIG. 13(C) is a front view of a control structure including a solenoid actuator looked in the direction of the arrow H.

DETAILED DESCRIPTION OF THE PREFERRED EMBODIMENTS OF THE INVENTION

Figure 1:
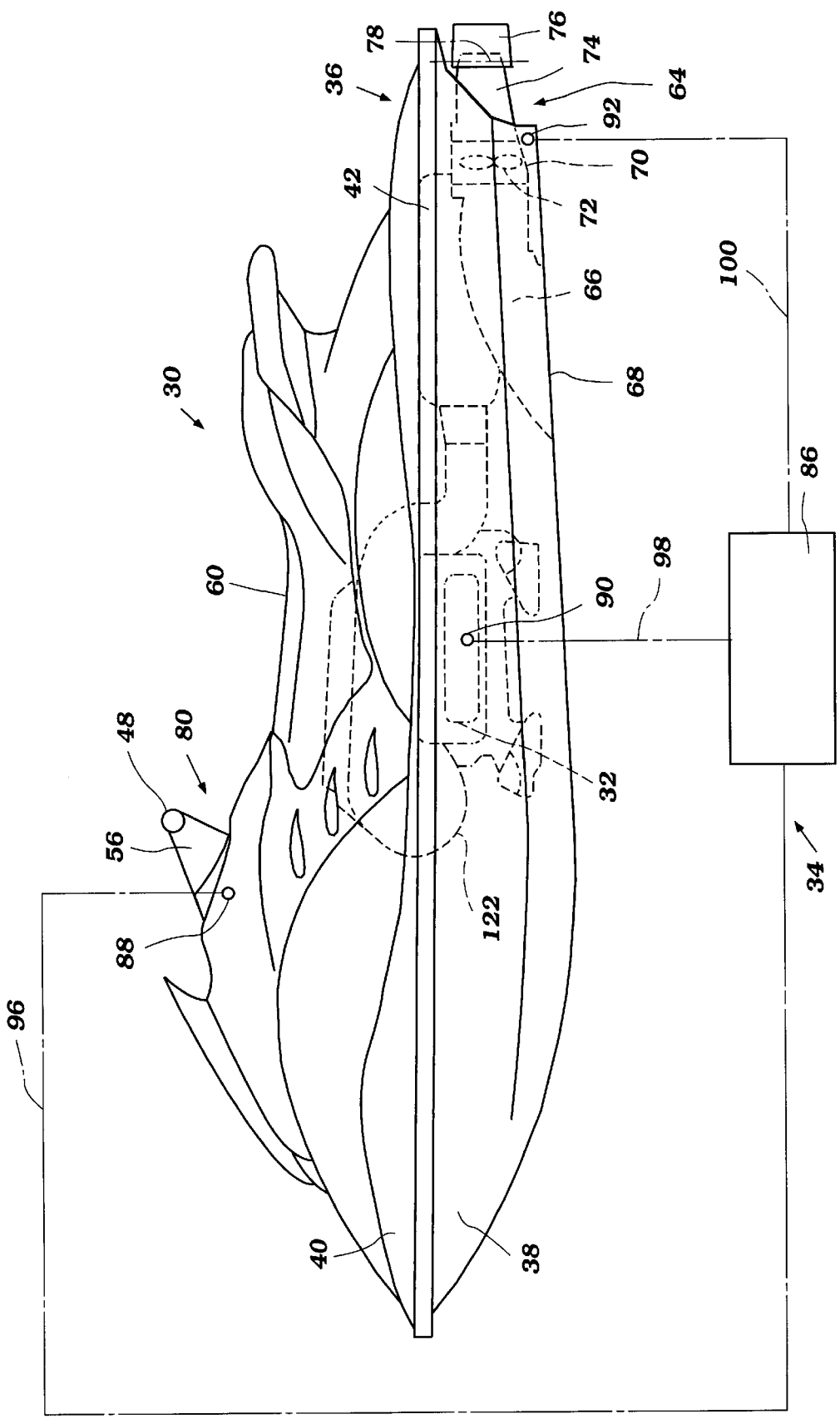
FIG. 1 is a side elevational view of a personal watercraft and schematically illustrates an engine control system configured in accordance with a preferred embodiment of the present invention.

With primary reference to FIG. 1 and additionally to FIGS. 2–10, an overall configuration of a personal watercraft 30 will be described.

The watercraft 30 employs an internal combustion engine 32 and an engine control system 34 configured in accordance with a preferred embodiment of the present invention. This engine control system 34 has particular utility with a personal watercraft, and thus is described in the context of the personal watercraft. The control system, however, can be applied to other types of watercraft as well, such as, for example, small jet boats.

The personal watercraft 30 includes a hull 36 generally formed with a lower hull section 38 and an upper hull section or deck 40. The lower hull section may include one or more inner liner sections to strengthen the hull or to provide mounting platforms for various internal components of the watercraft. Both the hull sections 38, 40 are made of, for example, a molded fiberglass reinforced resin or a sheet molding compound. The lower hull section 38 and the upper hull section 40 are coupled together to define an internal cavity. A gunnel or bulwark 42 defines an intersection of both the hull sections 38, 40.

Figure 10:
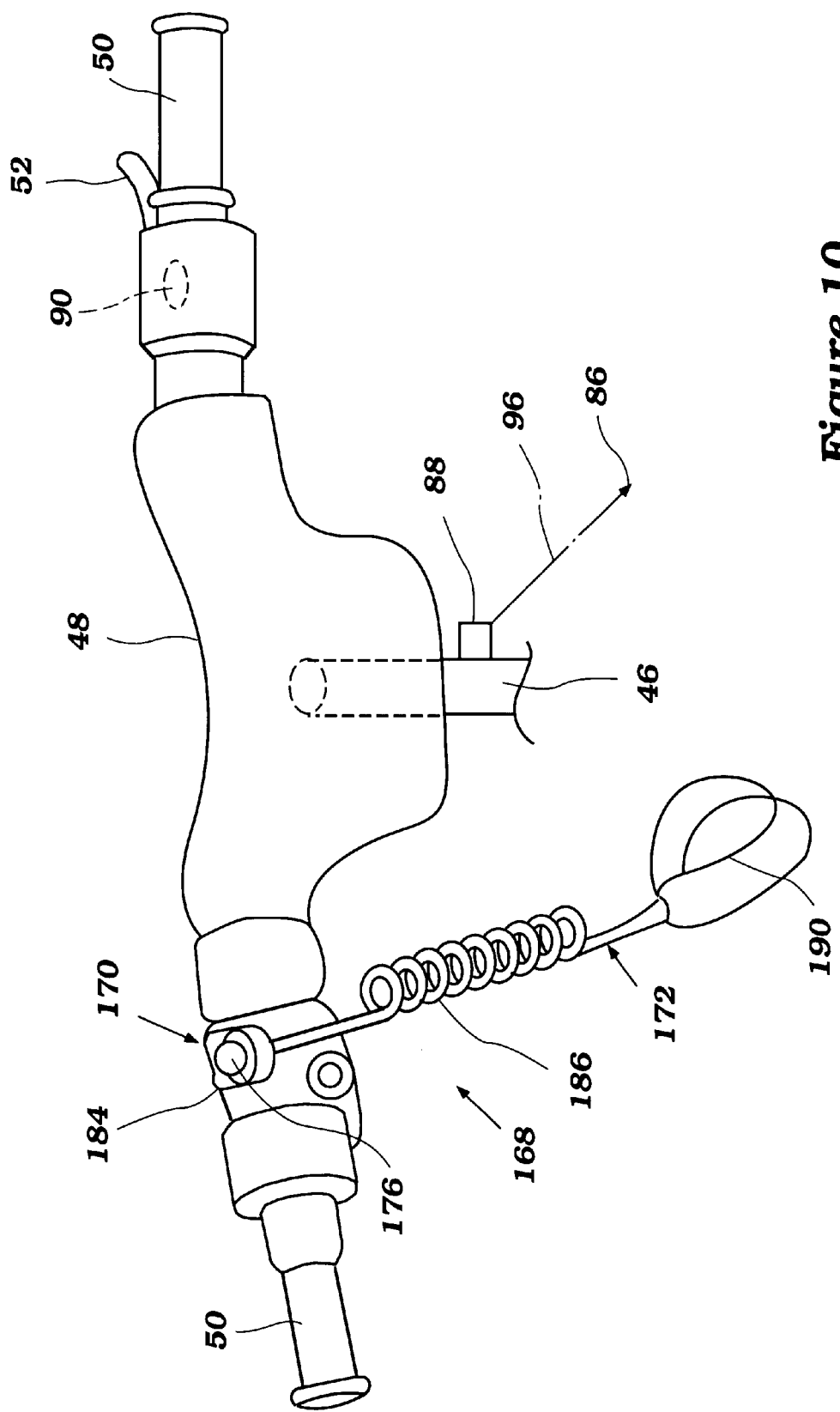
FIG. 10 is a perspective view of a steering mast and a handlebar disposed atop thereof. Both the steering mast and handlebar are part of the personal watercraft. A steering position sensing mechanism is schematically shown in this figure. A lanyard switch unit configured in accordance with the present embodiment is also shown in the figure.

A steering mast 46 (FIG. 10) extends generally upwardly almost atop the upper hull section 40 to support a handlebar 48. The handlebar 48 is provided primarily for a rider to control the steering mast 46 so that a thrust direction of the watercraft 30 is properly changed. As seen in FIG. 10, grips 50 are formed at both ends of the bar 48. The rider can hold them for steering the watercraft 30. The handlebar 48 also carries other control devices such as, for example, a throttle lever 52 for manually operating throttle valves 54 (FIGS. 6–9) of the engine 32. In the illustrated arrangement, the steering must 46 is covered with a padded steering cover member 56.

A seat 60 extends longitudinally fore to aft along a centerline of the hull 36 at a location behind the steering mast 46. This area, in which the seat 60 is positioned, is a rider's area. The seat 60 has generally a saddle shape so that the rider can straddle it. Foot areas are defined on both sides of the seat 60 and at the top surface of the upper hull section 40. A cushion, which has a rigid backing and is supported by a pedestal section of the upper hull section 40, forms part of the seat 60. The pedestal forms the other portion of the seat. The seat cushion is detachably attached to the pedestal of the upper hull section 40. An access opening is defined on the top surface of the pedestal, under the seat cushion, through which the rider can access an engine compartment defined in an internal cavity formed between the lower and upper hull sections 38, 40. The engine 32 is placed in the engine compartment. The engine compartment may be an area within the internal cavity or may be divided for one or more other areas of internal cavity by one or more bulkheads.

A fuel tank is placed in the cavity under the upper hull section 40 and preferably in front of the engine compartment. The fuel tank is coupled with a fuel inlet port positioned at a top surface of the upper hull section 40 through a filler duct. A closure cap closes the fuel inlet port.

At least a pair of air ducts or ventilation ducts is provided on both sides of the upper hull section 40 so that the ambient air can enter the internal cavity through the ducts. Except for the air ducts, the engine compartment is substantially sealed so as to protect the engine 32 and a fuel supply system (including the fuel tank) from water.

A jet pump unit 64 propels the watercraft 30. The jet pump assembly 64 includes a tunnel 66 formed on the underside of the lower hull section 38. In some hull designs, the tunnel is isolated from the engine compartment by a bulkhead. The tunnel 66 has a downward facing inlet port 68 opening toward the body of water. A jet pump housing 70 is disposed within a portion of the tunnel 66 and communicates with the inlet port 68. An impeller 72 is rotatably supported within the housing 70. An impeller shaft extends forwardly from the impeller 72 and is coupled with a crankshaft of the engine 32 so as to be driven by the crankshaft. The rear end of the housing 70 defines a discharge nozzle 74. A deflector or steering nozzle 76 is affixed to the discharge nozzle 74 for pivotal movement about a steering axis 78 extending generally vertically. A cable connects the deflector 76 with the steering mast 46 so that the rider can steer the deflector 76. A steering mechanism 80 for the watercraft thus preferably comprises the steering mast 46, the handlebar 48, the cable and the deflector 76.

When the crankshaft of the engine 32 drives the impeller shaft and hence the impeller 72 rotates, water is drawn from the surrounding body of water through the inlet port 68. The pressure generated in the housing 70 by the impeller 72 produces a jet of water that is discharged through the discharge nozzle 74 and the deflector 76. The water jet produces thrust to propel the watercraft 30. Maneuver of the deflector 76 changes the direction of the water jet. The rider thus can turn the watercraft 30 in either a right or a left direction by operating the steering mechanism 80.

As schematically shown in FIG. 1, the engine control system 34 preferably includes an ECU (electronic control unit) or control device 86, a steering position sensor 88, a throttle position sensor 90 and a watercraft velocity sensor 92. The ECU 86 is preferably mounted on the engine 32 or disposed in proximity to the engine 32. The steering position sensor 88 is preferably positioned adjacent to the steering mast 46 so as to sense an angle of the steering mast 46 when the rider operates it. The throttle position sensor 90 is preferably affixed at one end of throttle valve shafts 94 (FIGS. 6 and 7) so as to sense a position of the throttle valves 54. The watercraft velocity sensor 92 is preferably located at a rear bottom portion of the watercraft 30, which is submerged during a normal running condition of the watercraft 30. The respective sensors 88, 90, 92 are connected to the ECU 86 through signal lines 96, 98, 100, respectively. Of course, the signals can be sent through hard-wired connections, emitter and detector pairs, infrared radiation, radio waves or the like. The type of signal and the type of connection can be varied between sensors or the same type can be used with all sensors.

Figure 4:
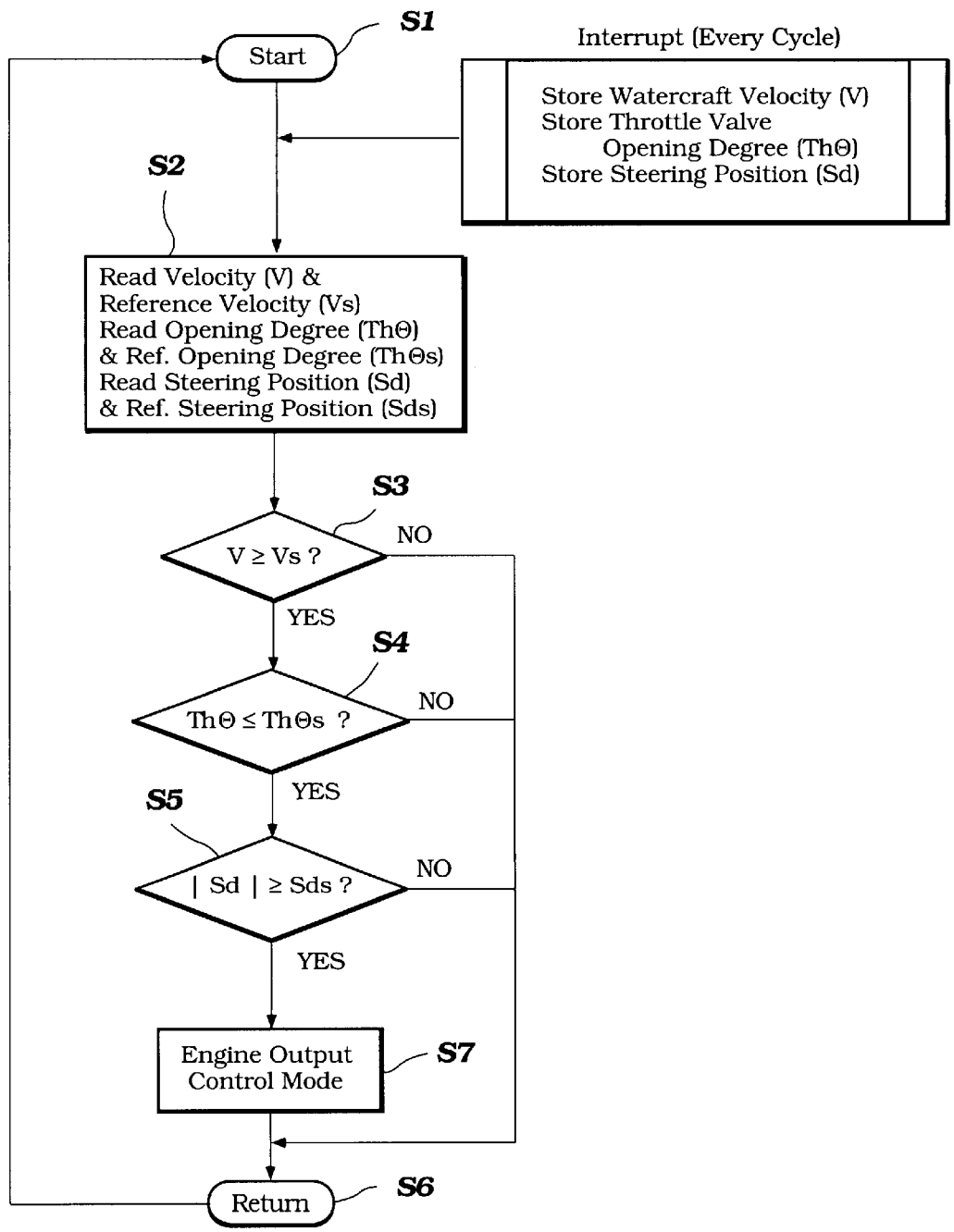
FIG. 4 is a control routine of an ECU of the control system.
Figure 5:
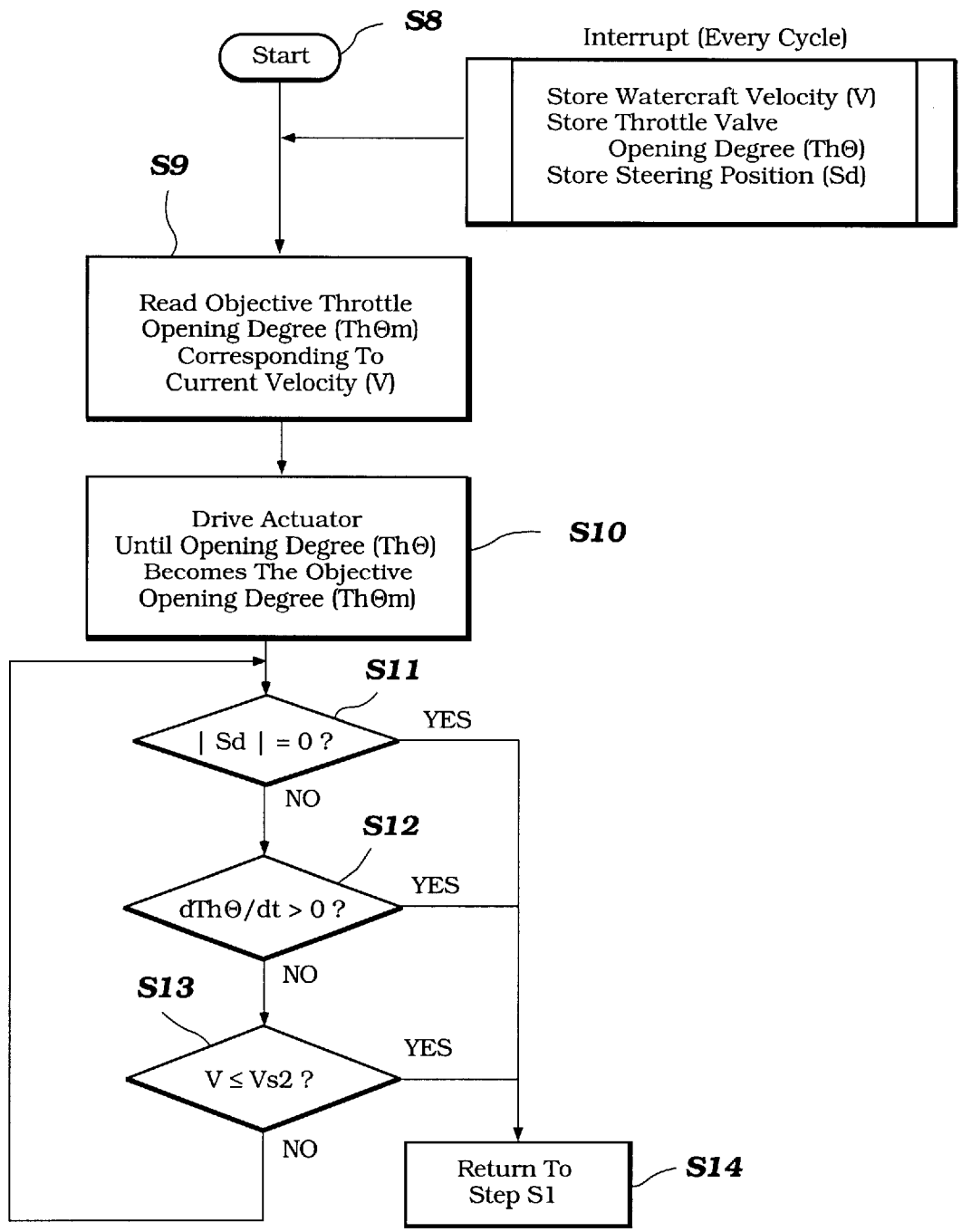
FIG. 5 is a sub-routine provided for the control routine.

The illustrated control system 34 preferably operates in accordance with a control routine shown in FIGS. 4 and 5, although other control routines are applicable inasmuch as complying with the control strategy of the present invention. The exemplary control routine as well as the control system 34 will be described in greater detail shortly.

The engine 32 preferably operates on a two-cycle crankcase compression principle and has three cylinders spaced apart from one another along the longitudinal centerline. The illustrated engine, however, merely exemplifies one type of engine on which various aspects and features of the present invention can be used. The invention can be used with engines having other number of cylinders, having other cylinder arrangements, other cylinder orientations (e.g., upright cylinder banks) and operating on other combustion principles (e.g., four cycle or rotary).

The engine 32 generally has a typical and conventional construction. That is, the engine 32 includes a cylinder block defining three cylinder bores in which pistons reciprocate. At least one cylinder head member is affixed to the upper end of the cylinder block to close respective upper ends of the cylinder bores and defines combustion chambers with the cylinder bores and the pistons. Separate cylinder heads for each cylinder bore also can be used. A crankcase member is also affixed to the lower end of the cylinder block to close the respective lower ends of the cylinder bores and to define a crankcase chamber with the cylinder block. The crankshaft is rotatably connected to the pistons through connecting rods and is journaled for rotation within the crankcase. The cylinder block, the cylinder head and the crankcase member preferably are made of aluminum alloy and together define an engine body 102.

Engine mounts 104 (FIG. 6) extend from both sides of the engine body 102. The engine mounts 104 preferably include resilient portions made of, for example, rubber material. The engine body 102 is mounted on the lower hull section 38 (or possibly on the hull liner) by the engine mounts 104 so that vibration of the engine body 102 is inhibited from conducting to the hull section 38.

Figures 6, 7:
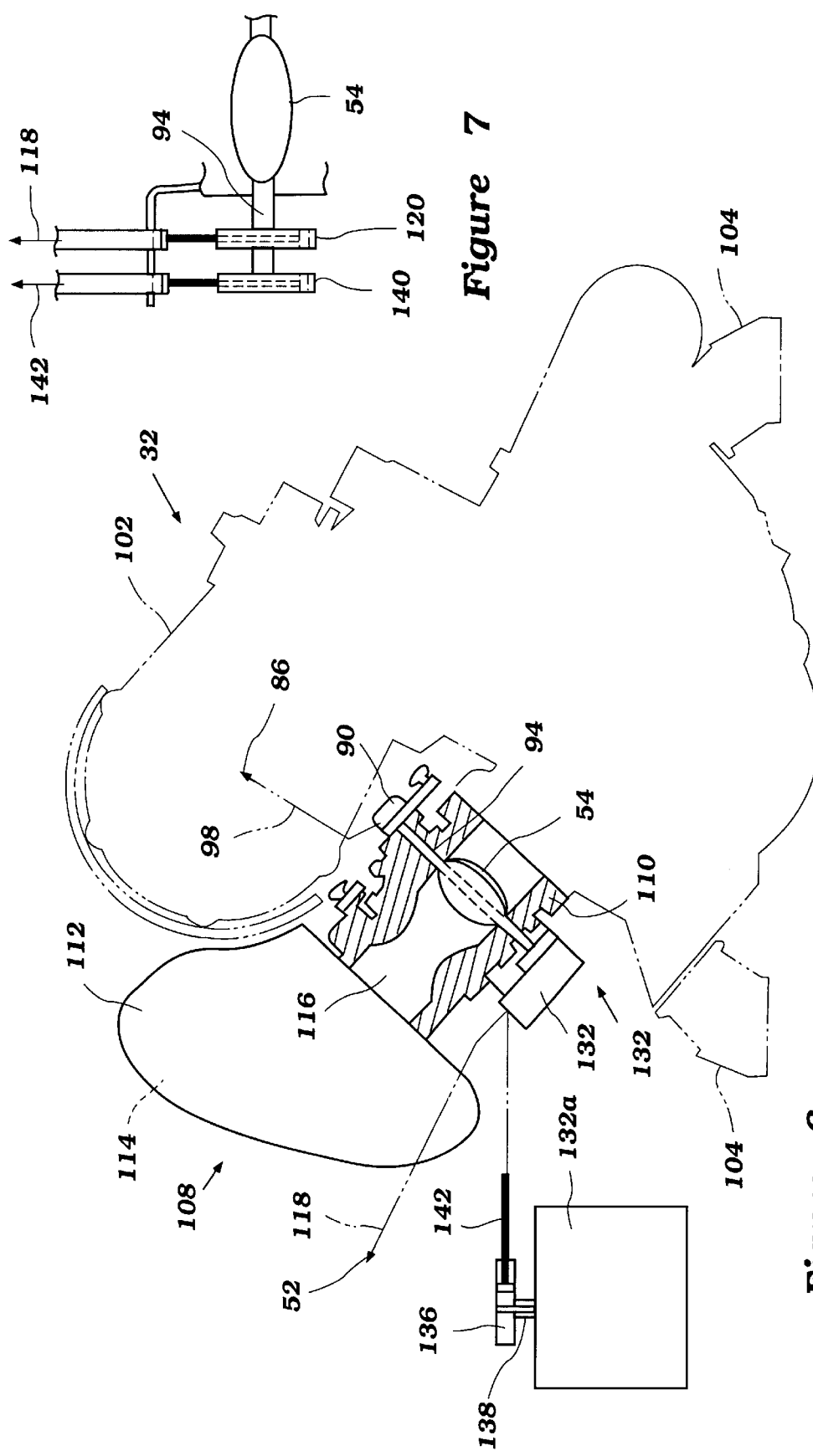
FIG. 6 is a schematic front view of the engine. A large part of the engine except for an air induction system and a throttle valve control mechanism is illustrated in phantom.
FIG. 7 is a schematic view of the throttle valve control mechanism.

The engine 32 preferably includes an air induction system 108 to introduce air to the combustion chambers. As seen in FIG. 6, in the illustrated embodiment, the air induction system is disposed on the starboard side of the engine body 102. The induction system 108 includes throttle bodies 110 affixed to the crankcase member, and a plenum chamber member or air intake box 112. The plenum chamber member 112 defines a plenum chamber 114 into which the air in the engine compartment enters. Preferably, the plenum chamber 114 smoothes the intake air and attenuates intake noise. The throttle bodies 110 each communicate with a respective individual chamber within the crankcase chamber that communicates with one of the combustion chambers through scavenge passages defined within the engine body 102. The throttle bodies 110 define intake passages 116 through which the air flows to the individual crankcase chambers.

The respective throttle valves 54 are disposed within the intake passages 116 so as to regulate the amount of air passing through the intake passages 116. Because the throttle valve shafts 94 are journaled on the throttle bodies 110 for pivotal movement about axes of the respective valve shafts 94, the respective throttle valves 54 can pivot to change opening degrees thereof The foregoing throttle lever 52 preferably is connected to the throttle valve shafts 94 through a throttle wire or cable 118. In the illustrated embodiment, the entire throttle valve shafts 94 are linked together so that the throttle wire 118 can be connected with only one of the shafts 94. As seen in FIG. 7, the throttle valve shaft 94 has a pulley 120 and the throttle wire 118 is affixed to the pulley 120 so as to coil around it. By operating the throttle lever 52, the opening degrees of the respective throttle valves 54 change so as to regulate proper amounts of air to the combustion chambers.

As described above, one of the throttle valve shafts 94 has the throttle position sensor 90 at one end thereof. The throttle position sensor 90 thus can sense an angular position of each throttle valve 54, i.e., an opening degree of each throttle valve 54.

The throttle valves 54 can be closed so as to bring the engine 32 to an idle state. Even at this idle state, the engine 32 still needs a small amount of air to maintain the idle state. An idle air supply mechanism thus is provided such as a sub-passage bypassing the throttle valves 54. A control valve for controlling the idle air amount can be provided at the sub-passage.

The engine 32 also includes a fuel supply system. The fuel supply system includes the fuel tank, a charge forming device and a fuel delivery mechanism that connects the fuel tank with the charge forming device. The charge forming device can take various structures such as a carburetor, a fuel injection mechanism or the like. If the fuel injection mechanism is employed, fuel can be sprayed either directly or indirectly to the combustion chambers. In the illustrated embodiment, an indirect fuel injection mechanism is employed.

The fuel injection mechanism includes one or more fuel injectors directed toward the respective intake passages and one or more fuel pumps to pressurize the fuel delivered to the fuel injectors. Each fuel injector has an injection nozzle that is exposed to the intake passage. The injection nozzle preferably is opened and closed by an electromagnetic unit that is slideable within an injection body. The electromagnetic unit has a solenoid coil controlled by electrical signals. When the nozzle is opened, pressurized fuel is sprayed to the intake passage. The sprayed fuel is drawn to the combustion chambers with the air passing through the intake passages.

The ECU 86 controls an amount of fuel sprayed into each intake passage 116. Because a pressure regulator strictly regulates the fuel pressure, the ECU 86 can vary the fuel amount by varying the duration of each injection. The ECU also can advance injection timing and initiation timing in order to increase the engine output.

The engine 32 further includes an ignition or firing system. Spark plugs of the ignition system are affixed to the cylinder head. A spark gap of each spark plug is exposed within an associated combustion chamber. Each spark plug ignites an air/fuel charge at an ignition timing controlled by the ECU. The ignition system preferably has an ignition mechanism including an ignition coil and an igniter. The ignition coil preferably is a combination of a primary coil element and a secondary coil element that are wound around a common core. The secondary coil element is connected to the spark plugs while the primary coil element is connected to the igniter. The primary coil element also is coupled with a power source (e.g. a battery). The igniter abruptly cuts off the current flow in response to an ignition timing control signal from the ECU. A high voltage current flow consequently occurs in the secondary coil element. The high voltage current flow forms a spark at each spark plug. The ECU 86 controls an ignition timing of the spark plugs in this manner.

The engine 32 further includes an exhaust system to discharge burnt charges, i.e., exhaust gases, from the combustion chambers. Exhaust ports are defined in the cylinder block and communicate with the associated combustion chambers. An exhaust manifold is connected to the cylinder block and communicates with the exhaust ports. Multiple exhaust conduits 122 (FIG. 1) are further coupled with the exhaust manifold in series so as to extend around the engine body 102 and then toward the tunnel 66. A discharge exhaust conduit 122 is connected to the tunnel 66 so that the exhaust gases are discharged into the tunnel 66 in a known manner.

With reference to FIGS. 1–10, and especially to FIGS. 2–5, the control system 34 and an exemplary control routine will now be described. It is to be noted that the control system 34 may be in the form of a hard wired feedback control circuit or may be constructed of a dedicated processor and a memory for storing a computer program and data. Additionally, the control system 34 may be constructed of a general purpose computer having a general purpose processor and the memory for storing the computer program for performing the control routine. Preferably, however, the control system 34 utilizes the engine ECU 86, which may be constructed in any of the above-mentioned forms.

FIG. 2 illustrates a block diagram of the control system 34 in which the ECU 86 controls an engine output control mechanism 130. In the illustrated embodiment, the engine output control mechanism 130 comprises the throttle valves 54 and a throttle valve actuator 132. The throttle valve actuator 132 actuates the throttle valves 54, and the ECU 86 controls the actuator 132 to control the opening degree of the throttle valves 54. As seen in FIG. 6, the throttle valve actuator 132 is mounted on one of the throttle bodies 110 and is connected with one of the throttle shafts 94. A linkage causes all of the throttle shafts 94 to move together, and thus, the actuator 132 can move all of the throttle shafts 94 even though it is coupled only to one. In the illustrated embodiment, the actuator 132 is coupled to the throttle shaft 94 to which the throttle valve position sensor 90 is also connected. The actuator 132 is disposed on one end of the shaft 94 (e.g., on an outer end relative to the engine body) and the sensor 90 is disposed on an opposite end of the shaft 94 (e.g., on an inner end).

The throttle valve actuator 132 preferably is a step motor or an electric motor employed in a feedback system. A servomotor 132a also can be used in place of the step motor.

Although a servomotor is usually larger than the step motor, the servomotor 132a may be desirable in some applications because it eliminates the need for the throttle valve position sensor 90.

In this variation, as illustrated in FIGS. 6 and 7, the servomotor 132a preferably is disposed apart from the engine body 102. The servomotor 132a has a pulley 136 on a shaft 138 that rotates about an axis (e.g., a vertical axis), while the throttle valve 54 has a corresponding pulley 140 on its shaft 94 next to the pulley 120 that is coupled to the throttle wire 118. A control wire 142 connects the pulleys 136, 140 with each other. The servomotor 132a moves the throttle shaft 94 in a controlled manner through this pulley system. The pulleys 140, 120, which are connected to the servomotor 132a and the throttle wire 118, respectively, can of course be positioned on different throttle shafts 94.

The throttle valve actuator 132, i.e., the step motor 132 or the servomotor 132a, is connected to the ECU 86 by a control line. Normally, the operator operates the throttle valves 54 by the throttle lever 52. The ECU 86, however, overrides the control of the throttle lever 52 and causes the throttle valve actuator 132 to increase or maintain the opening degree of the throttle valves 54 under certain conditions.

In the illustrated embodiment, three sensors or sensing mechanisms, i.e., the throttle valve position sensor 90, the steering position sensor 88 and a watercraft velocity sensor 92, are employed for sensing the respective states or velocity of the watercraft and its engine. The throttle valve position sensor 90 preferably is a potentiometer. As schematically shown in FIG. 10, the sensor 90 can be alternatively positioned next to the throttle lever 52 or any other place where the throttle opening degree can be sensed. Other sensors or sensing mechanisms such as a proximity sensor can also be used.

The steering position sensor 88 preferably is a proximity sensor positioned adjacent to the steering mast 46 and senses an angular position of the steering mast 46. Other types of sensors or sensing mechanisms also can be used.

The velocity sensor 92 of the watercraft 30 preferably is a paddle-wheel type sensor positioned at a bottom portion or a submerged stern portion of the watercraft 30. Any other sensors acting as velocity sensors such as a dynamic pressure sensor disposed with the tunnel 66 or a Pitot tube type sensor disposed toward the body of water can replace the paddle-wheel type sensor 92. It would also be possible to use a GPS (global positioning system) that uses an artificial satellite and includes a GPS antenna comprises a velocity sensing mechanism. The sensing mechanism using the GPS is described in, for example, Japanese Laid Open Publication No. Hei 11-43093.

The ECU 86 has stored in its memory a reference watercraft velocity (Vs). In the illustrated embodiment, the reference velocity (Vs) is selected from velocities greater than a velocity where the watercraft 30 starts planing. In general, the jet type watercraft 30 transfers from a displacement (trolling) range to a transient range at a velocity of 10–15 Km/h (at an engine speed of 2,000–2,500 rpm) and then transfers to the planing range at a velocity of 30–35 Km/h (at an engine speed of 4,500 rpm). The watercraft 30 can stay in a complete planing range when the velocity is 35 Km/h or more (at the engine speed is 4,500 rpm or more). In the illustrated embodiment, the maximum speed of the engine 32 is about 7,000 rpm. The present invention, however, can be used with engines having greater or lesser top-end speeds. The velocity of the watercraft when it starts planing also depends upon the size and shape of its hull, the weight of the watercraft, the location of the watercraft's center of gravity, and the performance of the jet propulsion unit, to name a few additional factors. The reference velocity (Vs) can be determined empirically for a particular watercraft design and then stored in the ECU of each watercraft made in accordance with such design. The predetermined reference velocity (Vs) of 15 Km/h in this embodiment thus is merely an example.

A reference throttle opening degree (Thθs) preferably is selected to correspond to a watercraft velocity that generates a thrust force sufficient to change sharply the direction of travel of the watercraft 30. The reference throttle opening degree (Thθs) increases with watercraft velocity. In the illustrated embodiment, where the throttle opening degree ranges from 0 to 90 degrees, the reference throttle opening degree (Thθs) preferably is not less than 30 degrees and increases with increasing watercraft speed. At throttle angles less than 30 degrees, the engine output may not be sufficient to produce enough thrust to turn the watercraft 30 sharply.

A reference steering position (Sds) also is preferably selected to correspond to a watercraft velocity. Unless the reference steering position (Sds) is large enough relative to the watercraft velocity, the watercraft 30 may not be as responsive as the rider would like at low speeds. The reference steering position (Sds) is variable and generally increases with increasing watercraft velocity. In the illustrated embodiment, the steering mast 46 rotates from a neutral position (for straight-ahead travel) by forty degrees (40°) to a fully turned position to each side. In other words, the steering mast 46 rotates from its neutral position (0°) by plus forty degrees (40°) when moved from the neutral position to a fully turned position to the right and by minus forty degrees (−40°) when moved from the neutral position to a fully turned position to the left. For such an embodiment, the reference steering position (Sds) preferably is not less than twenty degrees (20°) and varies relative to watercraft speed.

The ECU 86 has stored in its memory at least one map that relates the reference throttle opening degrees (Thθs) to watercraft velocities (V) and at least another map that relates the reference steering positions (Sds) to the watercraft velocities (V). These maps are used for selecting the reference throttle opening degree (Thθs) and the steering positions (Sds) in response to a continually sensed watercraft velocity (V).

More thrust generally is required to turn the watercraft 30 sharply at higher speeds. The present control system 32 thus is adapted to maintain or increase the throttle angle to a desired throttle opening degree in order to enhance the responsiveness of the watercraft 30 and to ease watercraft operations during such turns. For this purpose, the ECU 86 has stored in its memory a map of objective throttle opening degrees (Thθm), i.e., desired throttle opening degrees, versus watercraft speed. In general, the throttle opening degree (Thθm) increases with increases in watercraft speed.

With reference to FIGS. 4 and 5, an exemplary control routine for the ECU 86 will now be described below. At the start of the control routine (Step S1), the ECU 86 reads a current throttle valve opening degree (Thθ), a current steering position (Sd) and a current watercraft velocity (V) based upon the signals sent from the throttle position sensor 90, the steering position sensor 88 and the watercraft velocity sensor 92, respectively, and stores these values in memory as current data. While the sensed signals of the throttle position sensor 90 and the watercraft velocity sensor 92 are stored without alteration, the sensed signal of the steering sensor 88 is altered to be an absolute value (|Sd|) and then is stored. The data is renewed every cycle, i.e., when the routine returns to its start (Step S1).

At the step S2, the ECU recalls the reference watercraft velocity (Vs) from its memory. The program also determines from the stored maps the reference throttle valve opening degree (Thθs) and the reference steering position (Sds) that correspond to the current watercraft velocity (V).

The ECU then determines whether the watercraft velocity (V) is equal to or greater than the reference velocity (Vs), i.e., 15 Km/h (Step S3). If the watercraft velocity (V) is less than the reference velocity (Vs), the routine returns to its start (Step S6). If the watercraft velocity (V) is equal to or greater than the reference velocity (Vs), then the watercraft 30 is operating under a planing mode. Of course it is understood that the routine could be written such that the routine would proceed to Step S6 if the watercraft velocity were less than the reference velocity.

At Step S4, the ECU determines whether the throttle opening degree (Thθ) is equal to or less than the reference opening degree (Thθs), which is selected to correspond to the current watercraft velocity (V) and is at least 30 degrees. If not, the program returns to its start (Step S6). If yes, then the program proceeds to Step S5.

At Step S5, the ECU determines whether the steering position (|Sd|) is equal to or greater than the reference steering position (Sds), which is selected to correspond to the current watercraft velocity (V) and is at least 20 degrees. If not, the ECU returns to its start (Step S6) and repeats because at this time the rider is not steering the watercraft to turn sharply. If yes, the program proceeds to the Step S7 to assist the rider with the engine's control during the turn.

At this point (i.e., Step S7), the ECU performs an engine output control sub-routine illustrated in FIG. 5. At the start of the sub-routine (Step S8), the ECU 86 reads a current throttle valve opening degree (Thθ), a current steering position (Sd) and a current watercraft velocity (V) based upon the signals sent from the throttle position sensor 90, the steering position sensor 88 and the watercraft velocity sensor 92, respectively, and stores these values in memory as current data.

At the Step S9, the ECU determines from the stored map(s) an objective throttle opening degree (Thθm) that corresponds to the current watercraft velocity (V).

The ECU drives the throttle valve actuator 132 (Step S10) to actuate the throttle valves 54 until the opening degree (Thθ) of the throttle valves 54 becomes equal to the objective opening degree (Thθm). When the opening degree (Thθ) reaches the objective opening degree (Thθm), the ECU proceeds to the next step.

At Step S11, the ECU determines whether the steering mast 46 is at the neutral position, i.e., whether the steering position (|Sd|) is zero. If yes, the rider no longer wishes to turn sharply, and the ECU 86 returns (at Step S14) to the first step (Step S1) of the main routine. In doing so, the ECU ceases its engine output control mode. The actuator 132 no longer holds the throttle valves 54 to the objective opening degree (Thθm) under this condition and the rider can operate the throttle valves 54 without restriction. In accordance with other variations of the control routine, the ECU can likewise cease its engine output control mode if ECU determines that the steering mast 46 is less than the reference steering position (Sds) or is around zero (e.g., less than 10 degrees or more preferably less than 5 degrees). If not, however, the ECU proceeds to Step S12.

At Step S12, the ECU determines whether the throttle opening degree (Thθ) is increasing, i.e., whether the differential value of the throttle opening degree (Thθ) is greater than zero. If yes, the rider is increasing the throttle opening degree to an opening greater than the objective opening degree (Thθm) on his or her own. The program thus proceeds to Step S14 so as to return to Step S1 of the main routine. If not, the ECU proceeds to Step S13.

At Step S13, the ECU determines whether the watercraft velocity (V) is equal or less than another reference velocity (Vs2). The reference velocity (Vs2) is also stored in the memory of the ECU 86 and is preferably selected to be slightly slower than the reference velocity (Vs) used in Step S3. In the illustrated embodiment, the second reference velocity (Vs2) is equal to 10 Km/h, which is less than 15 Km/h (the first reference velocity (Vs)). If the watercraft velocity (V) is equal to or less than the second reference velocity (Vs2), then the power assistance provided by the engine output control mode is no longer provided. The ECU then moves to Step S14 to return to the first step of the main routine (Step S1). If, however, the watercraft velocity (V) is greater than the second reference velocity (Vs2), the ECU returns to Step S11 and proceeds in accordance with the above description. Thus, unless the rider has stopped turning, the rider has increased the throttle position independent of the control system, or the watercraft has slowed to a speed within the displacement or transitional ranges, the ECU continues to control the engine's output by instructing the actuator 132 to continue to hold the throttle valves 54 open to the objective opening degree (Thθm).

In order to simplify the control system 34, the reference throttle opening degree (Thθs) and the reference steering position (Sds) need not necessarily correspond to the watercraft velocity. That is, the reference throttle opening degree (Thθs) can be a fixed degree (e.g., 30 degrees). Also, the reference steering position (Sds) can be a fixed degree (e.g., 20 degrees).

The ECU can stop the engine control routine based upon other parameters than those of the quires of Steps S11, S12 and S13. For instance, the program can return to the main routine after the elapse of a predetermined time period following the completion of Step S10. The predetermined time could be constant or variable. If variable, the time period preferably would be longer for higher speeds.

In order to further simplify and increase the speed of performing the control routine, either Step S3 or Step S4 can be omitted, provided that at least one of these steps remains. Also, two of the Steps S11, S12, and S13 can be omitted if at least one of them remains.

The engine output control mechanism 130 can comprise other components or can take on other forms. For instance, as seen in FIGS. 8 and 9, an alternative control mechanism 130A includes a bypass passage 148 that bypasses one of the throttle valves 54 and an electromagnetic type control valve 150 that selectively opens and closes the bypass passage 148 under control of the ECU 86. This bypass mechanism supplies increased air to the combustion chamber when the control valve 150 opens the bypass passage 148 to increase engine speed. Preferably at least two of the throttle bodies include such a bypass mechanism. This type of engine output control mechanism 130A also can be used as the idle air supply mechanism described above.

The engine output control mechanism 130 also can include components of other systems whose operations affect engine output. For instance, as additionally illustrated in FIG. 2, the engine output control mechanism 130 can also include the ignition system and/or the fuel supply system. If the ignition system is used as part of the control mechanism 130, then the ECU 86 can control the ignition mechanism 156 to advance ignition timing of the spark plug(s) 156. If the fuel supply system is used as part of the control mechanism 130, then the ECU can control the fuel injectors to increase the injected fuel amount under the engine output control mode by advancing and/or increasing the duration of the fuel injection cycle.

The increase of the engine output can take a variety of patterns under the engine output control mode. FIG. 3(A) illustrates a pattern in which the engine output increases linearly. FIG. 3(B) illustrates another pattern in which the engine output increases non-linearly. The rate of change of the engine output can decrease over time as shown by the solid line in FIG. 3(B) or can increase over time as shown by the dotted line in the same figure. FIG. 3(C) illustrates a further pattern in which the engine output increases in a stepped manner.

If desired, the watercraft can also include a switchover mechanism to selectively activate or disable the ECU's engine output control mode. An exemplary switchover mechanism will be described below with reference to FIGS. 10 and 11.

Personal watercraft typically are provided with a lanyard switch unit 168 that permits the engine to be started when inserted and kills the engine when it is removed. The lanyard switch unit 168 includes a switch section 170 and a lanyard or tether section 172. The switchover mechanism can be incorporated into the lanyard switch unit 168.

Figure 11:
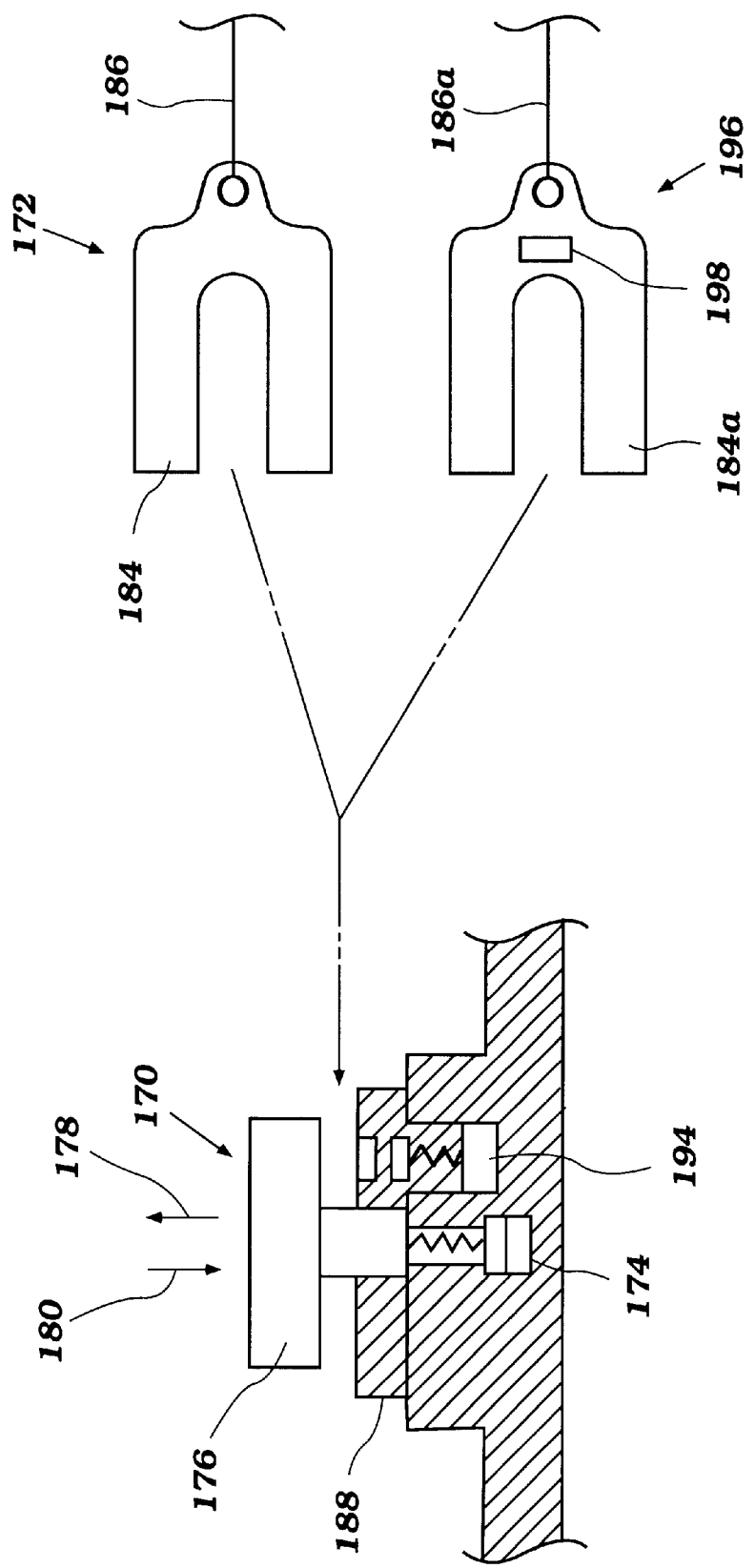
FIG. 11 is a schematic view of the lanyard switch unit including a switch section and a pair of lanyard sections selectively combined with the switch section.

In the illustrated embodiment, the switch section 170 is formed on the handlebar 48 and defines a main power switch of the watercraft 30. The switch section 170, however, can be disposed at other locations on the watercraft (e.g., disposed on the deck just forward of the seat and beneath the handlebar 48), and can function simply as a switch in the start and kill circuits of the watercraft rather than as the main power switch of the watercraft 30. The switch section 170 has a combination 174 of a fixed contact and a moveable contact, which is schematically illustrated in FIG. 11. When the moveable contact is connected to the fixed contact, a battery is connected to the electrical equipment of the engine and the engine can be started. When the moveable contact is disconnected from the fixed contact, however, the battery is disconnected from at least some of the electrical equipment and a kill circuit is activated. The switch section 170 also has a knob 176 that is moveable along an extending axis thereof. The knob 176 moves in a direction indicated by the arrow 178 and is biased in the opposite direction. When the knob 176 is moved in the direction of arrow 178 and held in a connected position, the movable contact mates with the fixed contact. But when the knob 176 is biased in the direction of arrow 180 back to a disconnected position, the movable and fixed contacts no longer mate.

The lanyard section 172 has a forked member 184 and a lanyard 186. The forked member 184 is connected with one end of the lanyard 186 and acts as a spacer that is disposed in a space defined between a switch body 188, which contains the contact combination 174, and the knob 176 so as to hold the contact combination 174 in the connected position. The other end of the lanyard 186 defines a closed circle portion 190 so that the rider can put it around his or her wrist or attach to a belt loop or the like. In the event the rider falls into the water while the lanyard is inserted, the forked member 184 is pulled from the space and the knob 176 moves back to the disconnected position. Engine operation accordingly stops.

The switch body 188 in the illustrated embodiment has another switch mechanism 194, next to the contact combination 174, that can selectively activate and disable the ECU 86. This switch mechanism 194 defines a proximity switch that senses magnetism. The switch mechanism 194 can of course use other switch constructions, such as, for example, but without limitation, a contact switch construction including a fixed contact and a moveable contact.

Another lanyard section 196 is provided. This second lanyard section 196 has a forked member 184a, which is similar to the forked member 184 of the first lanyard section 172 but includes a magnet piece 198. A lanyard 186a, which has the same configuration as the lanyard 186 of the first lanyard section 172, is connected to the second lanyard section 196. If the second lanyard section 196 replaces the first lanyard section 172, the magnetic piece 198 of the forked member 184a exists adjacent to the proximity switch mechanism 194 so that the ECU 86 is activated and the main switch turned on (i.e., the knob 176 is held in the connected position).

The rider can select one of the first lanyard section 172 and the second lanyard section 196 at his or her own choice. If the rider selects the first lanyard section 172, the ECU's engine output control mode control is disabled and the rider can control the engine output without restriction.

Another control strategy is practicable with the interchangeable switch mechanism. For instance, when the second lanyard section 196 is selected, the ECU can cap engine output. If the maximum output of the engine is 100 h.p. (engine speed 7,000 rpm), the ECU can restrict the engine's output to 80 h.p. (engine speed 6,000–6,500 rpm), for example.

Figure 12:
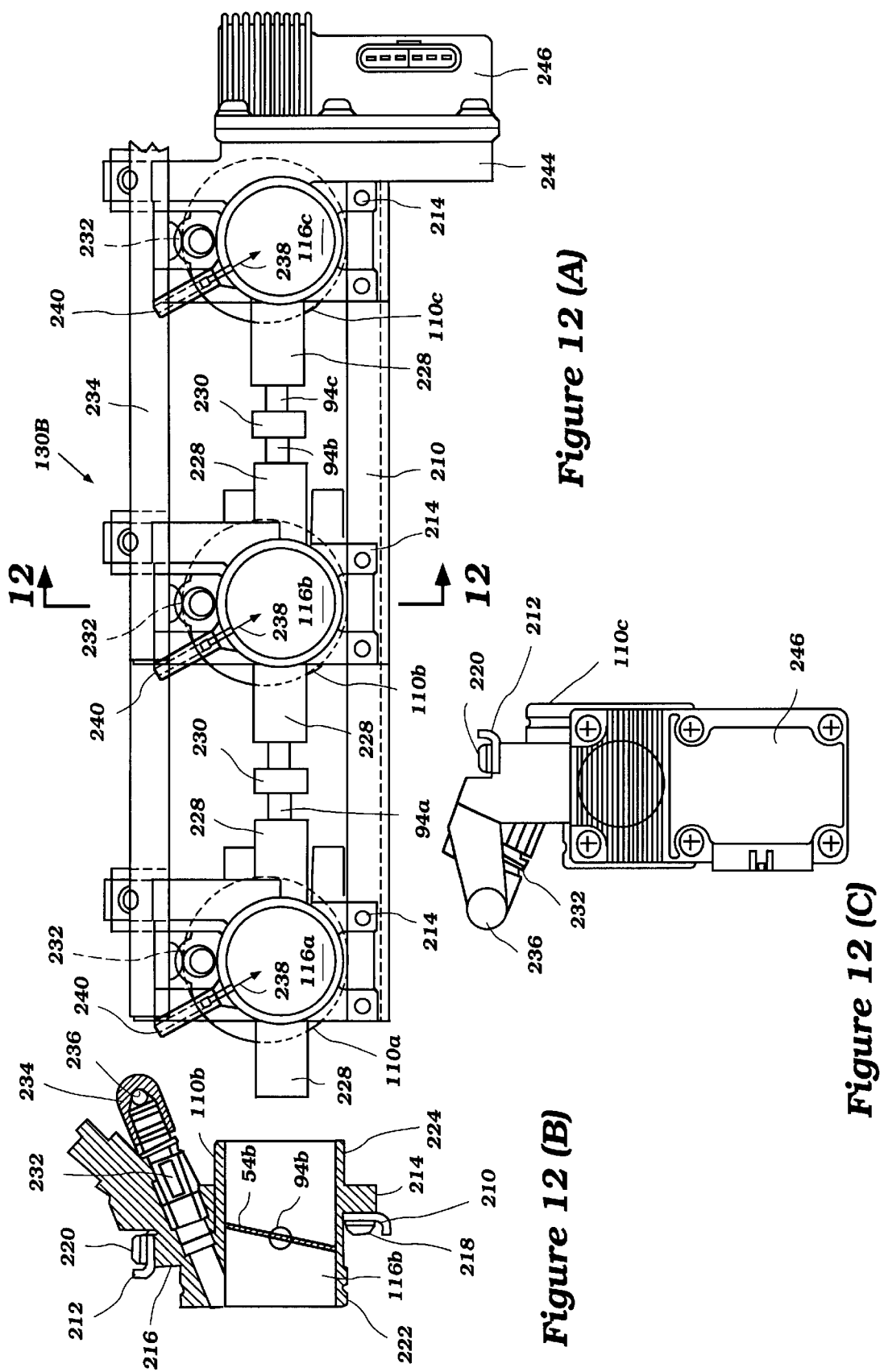
FIG. 12(A) is a side view of another throttle valve control mechanism configured in accordance with another preferred embodiment of the present invention.
FIG. 12(B) is a sectional view of the throttle valve control mechanism taken along the line 12—12 of FIG. 12(A).
FIG. 12(C) is a front view of the throttle valve control mechanism.

With reference to FIGS. 12(A)–(C), another embodiment of the throttle valve control mechanism, i.e., a further engine output control mechanism 130B, will be described below. The same reference numerals will be assigned to the same components and members that have been already described and further detailed description of such components and members will be omitted.

The engine in this embodiment also operates on a two cycle crankcase compression principle and has three cylinders. Three throttle bodies 101a, 110b, 110c are separately formed and coupled together by a lower linkage rail 210 and an upper linkage rail 212. That is, each throttle body 110a, 110b, 110c has a lower flange 214 that extends downward from the bottom thereof and defines a vertical face. Each throttle body 110a, 110b, 110c also includes an upper flange 216 that extends upward and defines a horizontal face. The respective lower flanges 214 are affixed to the vertical faces of the lower linkage rail 210 by screws 218, while the respective upper flanges 216 are affixed to the respective horizontal faces of the upper linkage rail 212 by screws 220. The linked throttle bodies 110a, 110b, 110c are affixed to the crankcase member of the engine body one side of the engine (e.g., the starboard side). One end 222 of each throttle body 110a, 110b, 110c communicates with the crankcase chamber through an appropriate intake manifold and the other end 224 communicates the plenum chamber via an appropriate sleeve. The throttle valve shafts 94a, 94b, 94c, which support the throttle valves 54a, 54b, 54c, are journaled by bearing portions 228 of the throttle bodies 110a, 110b, 110c for pivotal movement. Coupling members 230 couple the throttle valve shafts 94a, 94b, 94c with one another so that all of the valve shafts 94a, 94b, 94c rotate together. Return springs are provided around the respective throttle valve shafts 94a, 94b, 94c in the bearing portions 228 to bias the shafts 94a, 94b, 94c toward a position in which the throttle valves 54a, 54b, 54c are closed. In other words, the throttle valves 54a, 54b, 54c are urged toward the closed position unless an actuation force acts on the valve shafts 94a, 94b, 94c.

The fuel injectors 232 are affixed to the throttle bodies 94a, 94b, 94c so that each nozzle portion of the injector 232 is directed to the intake passage 116a, 116b, 116c downstream of the throttle valve 54b. A fuel rail 234 is affixed to the throttle bodies 94a, 94b, 94c so as to support the fuel injectors 232 and also to form a fuel passage 236 therein through which the fuel sprayed by the injectors 232 is delivered.

In the illustrated embodiment, lubricant oil 238 is also injected toward the journaled portions of the valve shafts 94a, 94b, 94c in the intake passages 116a, 116b, 116c through oil injection nozzles 240. Lubricant injection at this point tends to inhibit salt water from depositing on the valve shafts and at the journaled portions of the valve shaft.

A motor flange 244 is unitarily formed with the most forward portion of the throttle body 110c and a valve control motor 246 is affixed thereto. The throttle valve shafts 94a, 94b, 94c in this arrangement are actuated only by this motor 246 in either a manual control mode by the rider or the engine output control mode by the ECU 86. No mechanical control wire or cable connects the throttle lever 52 and the valve shafts 94a, 94b, 94c. Instead, the throttle lever 52 is connected to a throttle lever position sensor that sends a signal to the ECU 86 through a signal line.

The engine output control mechanism 130B needs no throttle position sensor because the motor 246 has a built-in position sensor by which a signal indicating a position of the shafts 94a, 9b, 94c is sent to the ECU 86. A watertight cover protects the motor 246. Because of the arrangements and constructions of the throttle bodies and valve control motor, the engine output control mechanism 130B is simple, accurate and durable.

With reference to FIGS. 13(A)–(C), a further embodiment of the throttle valve control mechanism 130C, i.e., engine output control mechanism, will be described below. The same reference numerals will also be assigned to the same components and members that have been already described and further detailed description of these components and members will be omitted.

In this arrangement, a pulley 250 is affixed to the middle throttle shaft 94b and a throttle wire 252 is affixed to the pulley 250. The throttle wire 252 also is connected to the throttle lever 52 so that the rider can manually operate the valve shafts 94a, 94b, 94c through the throttle wire 252. In the illustrated embodiment, the pulley 250 is disposed between the front throttle body and the middle throttle body. The pulley 250, however, can be disposed between the middle throttle body and the rear throttle body, and can be connected to any of the throttle shafts.

In the illustrated embodiment, the coupling 230 is positioned between the middle throttle body 110b and the rear throttle body 110a and has a lever portion 254 extending outward. The coupling 230 preferably lies on one side of the middle throttle body and the pulley 250 lies on the other side in order to simplify construction and provide a compact arrangement of these components.

A solenoid actuator 256 is disposed in a space between the middle throttle body 110b and the rear throttle body 110a. The solenoid actuator 256 depends from the upper linkage 212 and is affixed thereto. Also, a bracket 258, which is affixed to the rear throttle body 110a, extends forwardly from the rear throttle body to support a body of the actuator 256. The solenoid actuator 256 has a plunger 260 that extends toward the lever portion 254 of the coupling 230. The plunger 260 extends when a solenoid of the actuator 256 is activated to push or hold the lever portion 254 downward under control of the ECU 86.

The throttle position sensor 90 is affixed to a forward end of the throttle valve shaft 94c that is placed at the most forward position. The position sensor 90 senses the opening degree of the throttle valves 54a, 54b, 54c and send a signal to the ECU 86 as described above.

Normally, the rider manually operates the throttle shafts 94a, 94b, 94c through the wire 252 and the pulley 250. When the ECU 86 starts the engine output control mode, the plunger 260 pushes the lever portion 254. Under this condition, the throttle valve shafts 94a, 94b, 94c rotate to increase the throttle opening degree. The manual operation of the shafts 94a, 94b, 94c is regulated not to decrease the opening degree and is only allowed to increase further the opening degree. The plunger 260 also can be extended to prevent closing rotation of the throttle valves beyond the objective opening degree.

Because the solenoid actuator 256 is disposed between the throttle bodies 110a, 110b and hence is protected thereby, the engine output control mechanism 130C is durable and is protected, particularly against water.

Figure 14:
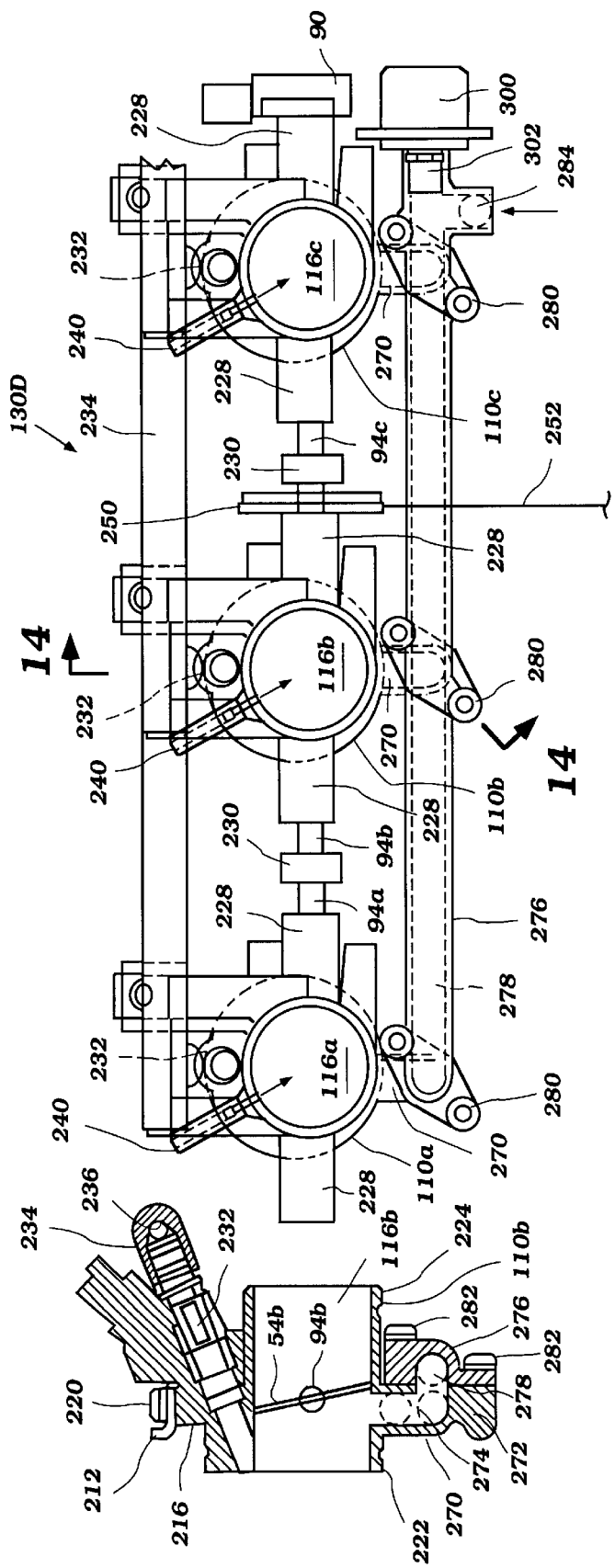
FIG. 14(A) is a side view of another throttle valve control mechanism configured in accordance with a further preferred embodiment of the present invention.
FIG. 14(B) is a sectional view of the throttle valve control mechanism taken along the line 14—14 of FIG. 14(A).

With reference to FIGS. 14(A) and (B), another embodiment of the throttle valve control mechanism 130D (i.e., the engine output control mechanism) will be described below. The same reference numerals will again be assigned to the same components and members that have been already described and further detailed description of such components and members will be omitted.

Like the engine output control mechanism 130C, the pulley 250 is affixed to the middle throttle shaft 94b and the throttle wire 252 is affixed to the pulley 250. The throttle wire 252 is connected to the throttle lever 52 so that the rider can manually operate the valve shafts 94a, 94b, 94c through the throttle wire 252. The throttle position sensor 90 is affixed to the forward end of the throttle valve shaft 94c to sense the opening degree of the throttle valves 54a, 54b, 54c and is connected to the ECU 86.

In this arrangement, each throttle body 110a, 110b, 110c has a projection 270 with a flange 272. The projection 270 is positioned at a bottom surface of the throttle body 110a, 110b, 110c to define an air inlet pathway 274 therein disposed directly downstream of the throttle valve 54a, 54b, 54c.

An air delivery conduit 276, which defines an air delivery passage 278 therein, is attached to the respective projections 270 so that the delivery passage 278 communicates with the respective inlet pathways 274. The air delivery conduit 276 has flanges 280 shaped to be the same configuration as the flanges 272 of the throttle bodies 110a, 110b, 110c and the flanges 271, 280 are affixed together by screws 282 so as to rigidly fix the delivery conduit 276 to the respective throttle bodies 110a, 110b, 110c. The delivery conduit 276 has an inlet projection 284 extending downward and defining an air inlet port 286 therein at the most forward portion. The air inlet port 286 communicates with the plenum chamber 114 by an external conduit so that the air in the plenum chamber 114 is supplied to the delivery passage 278. Because the delivery conduit 276 links the throttle bodies 110a, 110b, 110c, the foregoing lower linkage rail 210 is not provided and the resulting construction is simple and is easily manufactured.

A solenoid valve device 300 is affixed to the delivery conduit 276 and is disposed next to the inlet projection 284.

The solenoid valve device 300 has a piston valve 302 that is disposed within the delivery passage 278 and is reciprocally moveable along an axis of the delivery passage 278. The piston valve 302 is normally positioned at a cross section of the inlet port 286 with the delivery passage 278 to inhibit communication therebetween. The solenoid valve device 300 has a solenoid that actuates the piston valve 302 under control of the ECU 86. When the solenoid is activated, the piston valve 302 retreats to allow the air from the plenum chamber 114 to flow into the delivery passage 278.

In order to increase engine speed, the ECU 86 activates the solenoid to pull back the piston valve 302. The inlet port 286 thus can communicate with the delivery passage 278 and the air, which is allowed to flow through the delivery passage 278, is added to the air that passes through the main intake passages 116a, 116b, 116c. As a result, the total air amount delivered to the crankcase increases and hence the engine output also increases.

Figure 15:
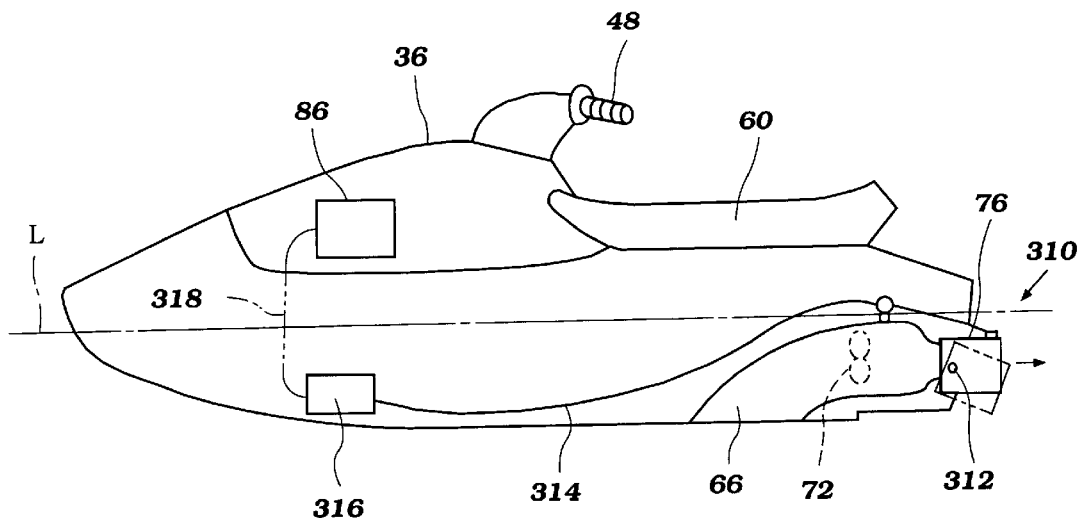
FIG. 15 is a side view of the watercraft having a trim control mechanism. The trim control mechanism is not activated in this figure.
Figure 16:
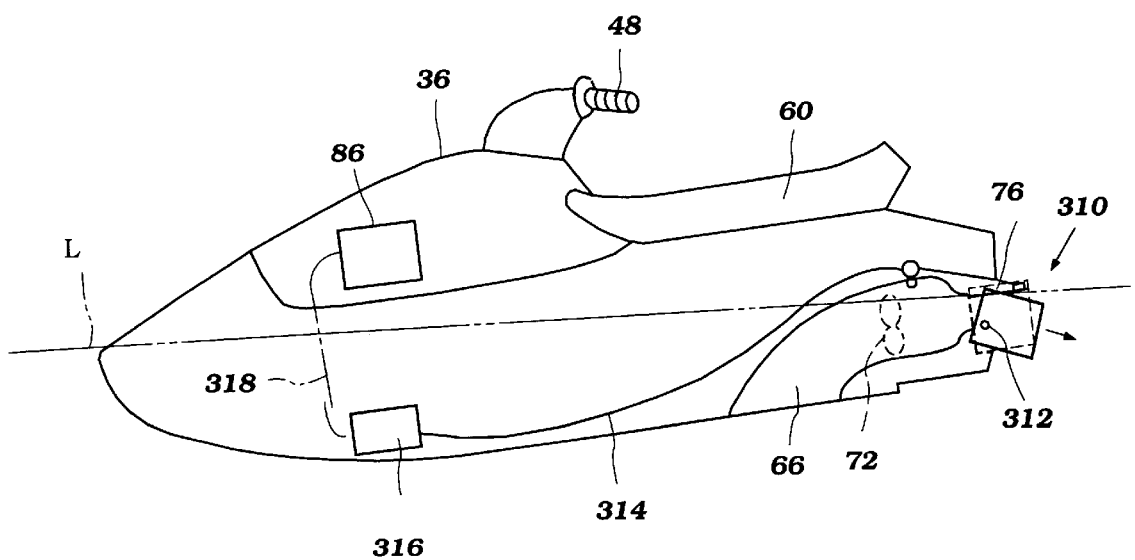
FIG. 16 is the same side view of the watercraft of FIG. 15, and the trim control mechanism is activated in this figure.

FIGS. 15 and 16 illustrate a preferred embodiment of the watercraft in which the watercraft 30 additionally incorporates a trim control mechanism 310. Again the same reference numerals will be assigned to the same components and members that have been already described and further detailed description of such components and members will be omitted.

The deflector 76 in this arrangement is pivotal not only in a horizontal plane about the axis 78 (FIG. 1) extending generally vertically but also in a vertical plane about an axis 312 extending generally horizontally. A trim cable or rod 314 is connected to a portion of the deflector 76 positioned atop thereof. The other end of the cable 314 is connected to a trim actuator or winch 316. Specifically, the actuator 316 has an appropriate pulley and the cable 314 is affixed to the pulley so as to coil around it. The ECU 86 controls the actuator 316 through a control line 318. While in the illustrated embodiment the actuator 316 is disposed toward a fore end of the watercraft, it is understood that the actuator can 316 be disposed at other locations on the watercraft (e.g., within the interior cavity above the tunnel or within the tunnel).

The deflector 76 is normally positioned in a neutral trim position as generally illustrated in FIG. 15 and the watercraft 30 lies generally along the water line L. During the engine output control mode, the ECU 86 also controls the actuator 316 so that the deflector 76 inclines to direct the resulting water jet oblique downward as shown in FIG. 16. The thrust force produced by the water jet under this condition raises the stern of the watercraft 30 and forces the watercraft's bow downward relative to the water line L, as schematically illustrated in FIG. 16.

In a variation, a bucket is additionally affixed to the deflector 76 for pivotal movement about a horizontal axis. The cable 314 is connected with the bucket to move the bucket up and down. The deflector 76 in this form may be configured to rotate only about the steering axis. When the bucket is brought into a position that produces a downwardly directed water jet (similar to that produced by the deflector 76 in FIG. 16), the watercraft's bow is forced down against the water.

Figure 17A:
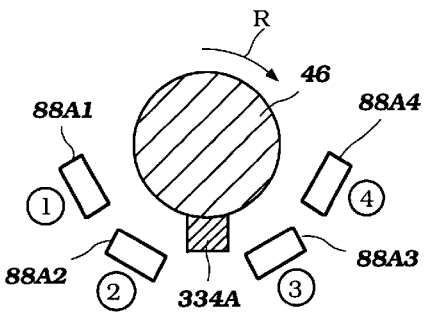
FIG. 17(A) is a schematic view of preferred embodiment of the steering position sensing mechanism.

With reference to FIGS. 17(A)–21(B), exemplary steering position sensors 88 will now be described below. FIG. 17(A) illustrates four steering position sensors 88A1–4 disposed around the steering mast 46. The position sensors 88A–4 are electromagnetic type proximity sensors. Each sensor is configured to generate a pulse signal when a metallic substance such as iron approaches the sensor. A single projection 334A, which is such a metallic substance, is formed on a side surface of the steering mast 46.

Figure 17B:
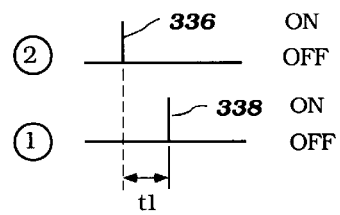
FIG. 17(B) is a time chart of sensed signals.

If the steering mast 46 is operated clockwise as indicated by the arrow R, the projection 334A approaches the sensors 88A2, 88A1 and the sensors generate pulses 336, 338, respectively, as shown in FIG. 17(B). The time difference (t1) between the pulses 336, 338 depends upon how fast the rider operates the steering mast 46. The faster the operation, the shorter the time difference. Because the pulses 336, 338 reach the ECU 86 in this order with the time difference (t1), the ECU 86 recognizes that the steering mast 46 is steered to make a right turn and how slowly or quickly the steering mast 46 is operated. If the steering mast 46 is operated counterclockwise, the ECU 86 recognizes with the sensors 88A3 and 88A4 that the steering mast 46 is steered to make a left turn and how quickly the steering mast 46 is turned in the same manner. It should be noted, however, the recognition of steering direction is not necessary for the control of ECU 86. The ECU may, however, use the time difference (t1) as another parameter in determining whether to initiate its engine output control mode.

Figure 18A:
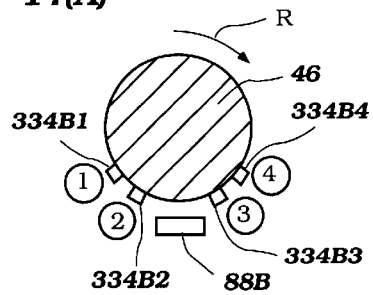
FIG. 18(A) is a schematic view of preferred embodiment of the steering position sensing mechanism.
Figure 18B:
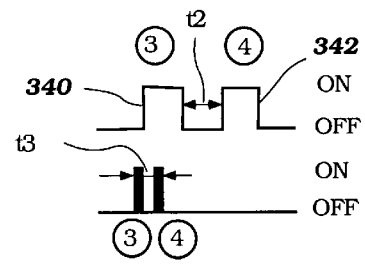
FIG. 18(B) is a time chart of sensed signals.

FIG. 18(A) illustrates a combination of a single steering position sensor 88B, which is also the electromagnetic type, and four projections 334B1–4 disposed around the steering mast 46. If the steering mast 46 is operated clockwise as indicated by the arrow R, the projections 334B3, 334B4 approach the sensor 88B in this order and generate pulse 340, 342 also in this order as shown in FIG. 18(B). As noted above, if the operation is slow, the time difference (t2) between the pulses 340, 342 is long. If, however, the operation is quick, the time difference (t3) therebetween is short.

Figure 19A:
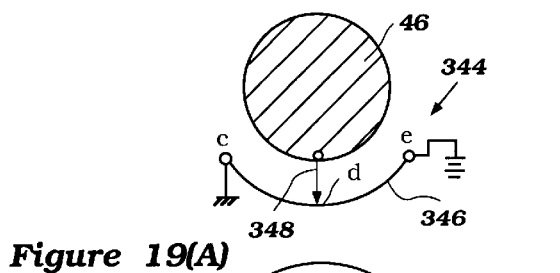
FIG. 19(A) is a schematic view of a further preferred embodiment of the steering position sensing mechanism.
Figure 19B:
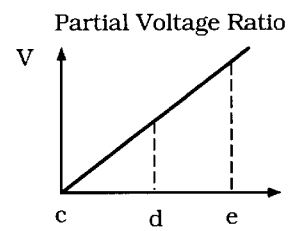
FIG. 19(B) is a graph showing a partial voltage ratio of the steering position sensing mechanism

FIG. 19(A) illustrates a potentiometer type sensor 344. This sensor 344 comprises a resister 346 having an appropriate length (c–e) disposed around the steering mast 46 and an output pin or wiper 348 extending from a side surface of the mast 46. A tip portion of the pin 348 abuts on the resister 346. The pin 348 is adjusted to be positioned at a point (d), which is a mid point of the length (c–e) when the steering mast 46 is in a neutral position. If the steering mast 46 is operated and the output pin 348 slides over the resister 346, the sensor 344 outputs a signal having a partial voltage corresponding to an angular position of the steering mast 46 as shown in FIG. 19(B). The ECU 86 thus recognizes the steering position by receiving the signal. Also, a differentiated value of the partial voltage by time is a change rate of the steering position.

Figure 20A:
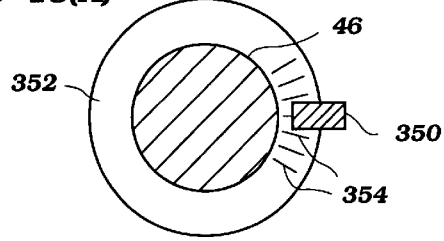
FIG. 20(A) is a schematic view of a still further preferred embodiment of the steering position sensing mechanism.
Figure 20B:
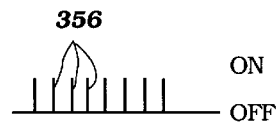
FIG. 20(B) is a time chart of sensed signals.
Figure 21B:
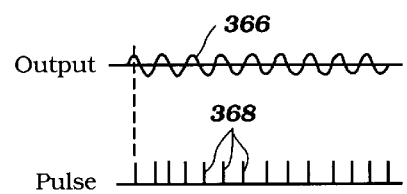
FIG. 21(B) is a time chart of sensed signals.

FIG. 20(A) illustrates a photo-coupler type sensor 350. The steering mast 46 has a flange 352 extending around and a plurality of slits 354 are provided at the flange 352. The section of the flange 352 with the slits is interposed between elements of the sensor 350, i.e., between a light source and a phototransistor or diode. When the steering mast 46 is operated, the sensor 350 generates pulses 356, as shown in FIG. 20(B). The ECU 86 recognizes a magnitude of the position (angular) change by the number of the pulses 356 and also recognizes a speed of the change by the density of the pulses 356.

Figure 21A:
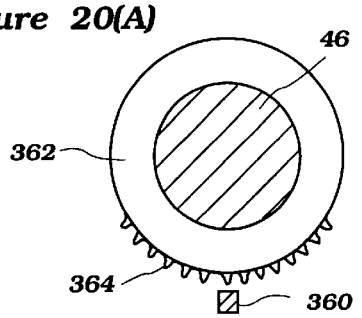
FIG. 21(A) is a schematic view of a yet further preferred embodiment of the steering position sensing mechanism.

FIG. 21(A) illustrates an electromagnetic pickup type sensor 360. The steering mast 46 also has a flange 362 extending around its periphery and a plurality of projections 364 is provided at the outer periphery of the flange 362. The sensor 360 is disposed adjacent to the flange 362. When the steering mast 46 is operated, the sensor 360 generates output waveform 366, shown in FIG. 21(B). The output is rectified and shaped to be pulses 358. The ECU 86 recognizes a magnitude of the change by the number of the pulses 358 and also recognizes a speed of the change by the density of the pulses 358.

The sensors described above are merely examples and other types of sensors such as a contact type, a capacitor type and a Hall integrated circuit type are all available. Also, the sensors or sensing mechanism can be used not only for sensing the steering position but also for sensing other angular positions such as the throttle valve position and the throttle lever position.

Figure 22:
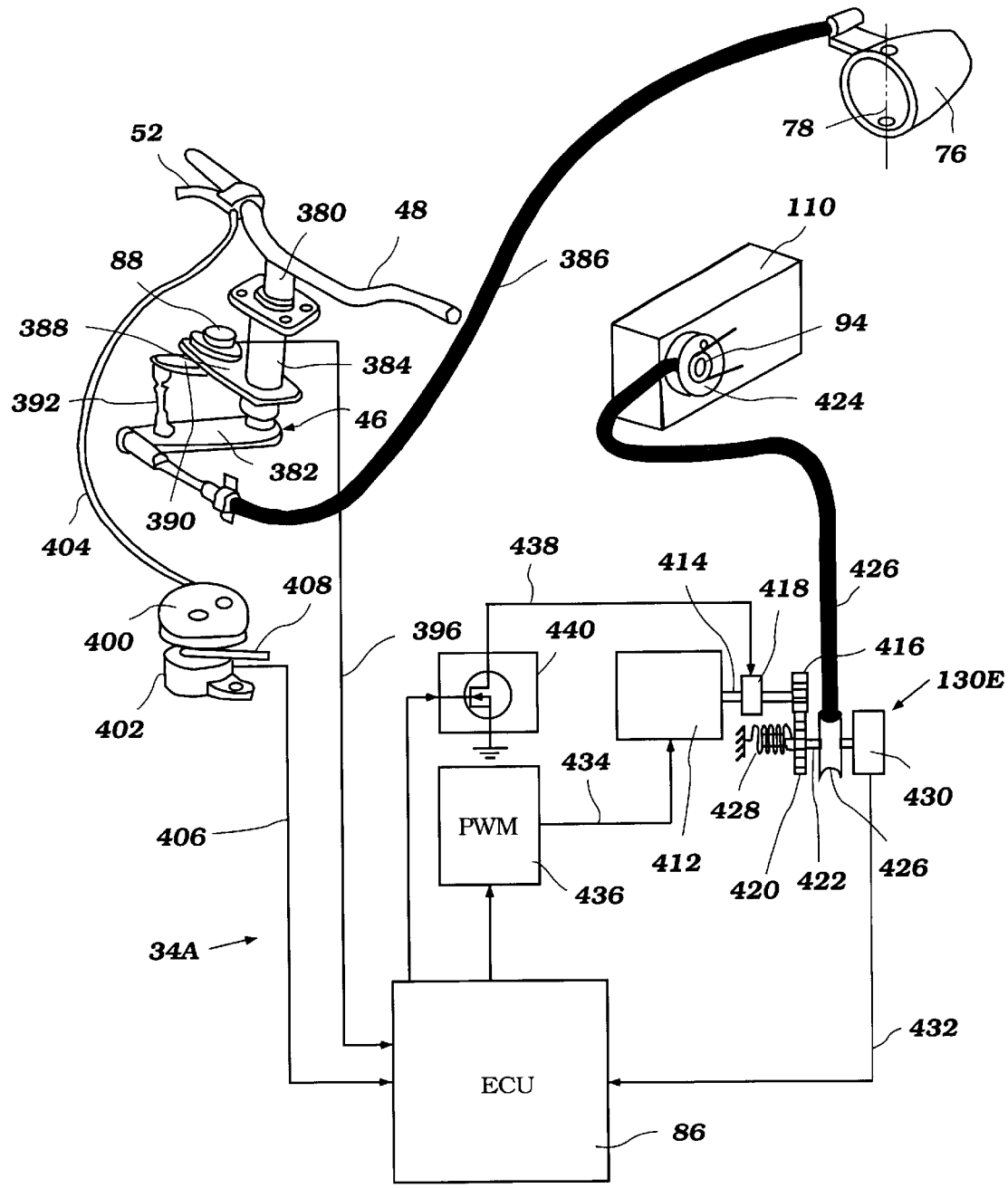
FIG. 22 is a schematic view showing another embodiment of the control system.
Figure 23:
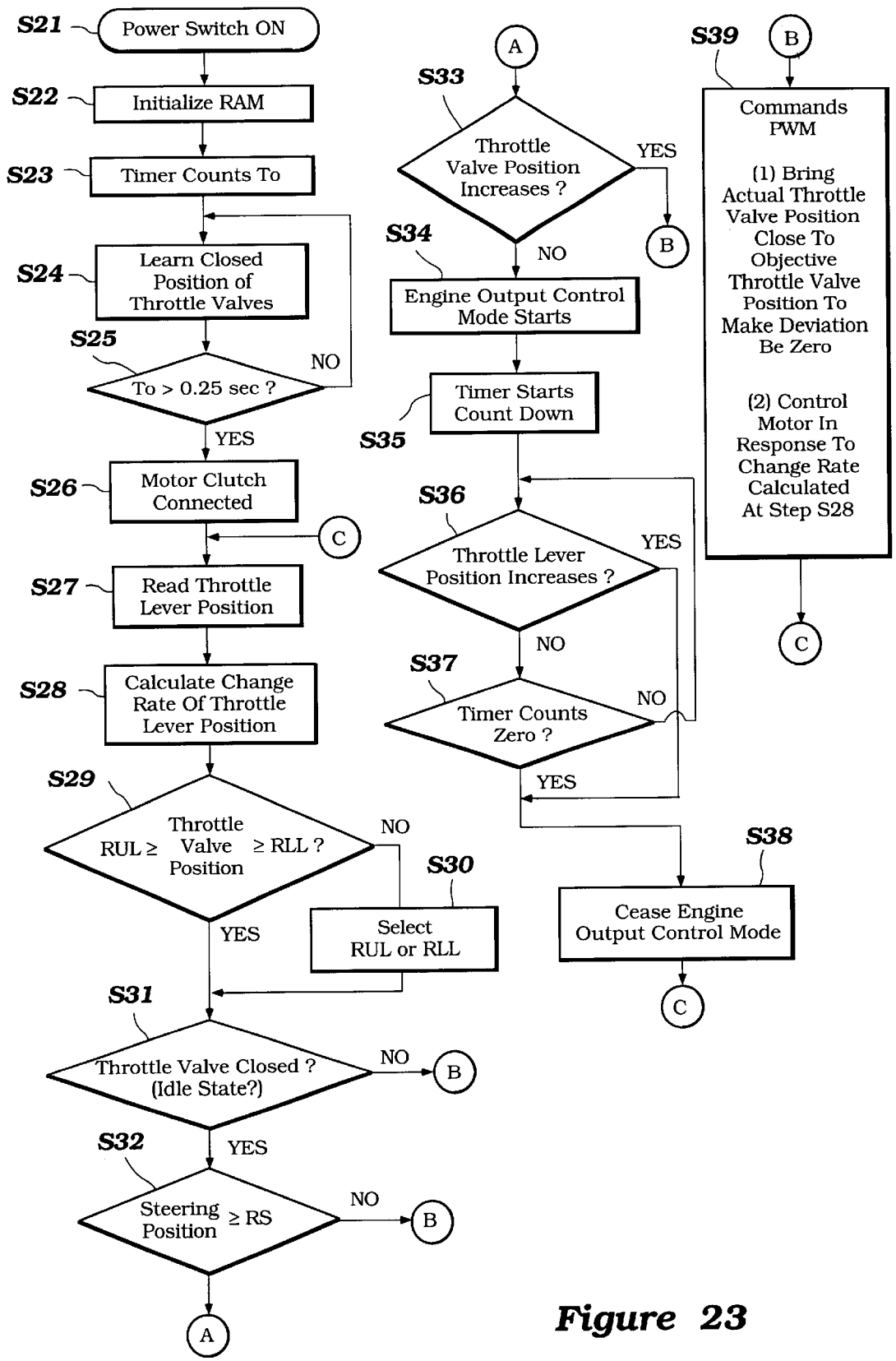
FIG. 23 is a control routine of an ECU of the control system shown in FIG. 22.

With reference to FIGS. 22 and 23, a further embodiment of the control system will now be described. The same reference numerals will again be assigned to the same components and members that have been already described and further detailed description of such components and members will be omitted.

FIG. 22 illustrates a further control system 34A. The steering mast 46 includes a steering shaft 380, the handlebar 48, a steering arm 382 and a tubular steering column 384. While the handlebar 48 is formed atop the steering shaft 380, the steering arm 382 is rigidly affixed to the bottom portion of the steering shaft 380. The steering column 384 is affixed to the upper hull section 40. The steering column 384 supports the steering shaft 380 for steering movement. With the rider steering with the handlebar 48, the steering arm 382 moves generally in a plane normal to the steering shaft 380. The steering arm 382 is connected to the deflector 76 through a deflector cable 386, and the deflector 76 pivots about the vertical axis 78 with the movement of the steering arm 382 in a known manner. A sensor arm 388 on which the steering position sensor 88 is disposed is rigidly affixed to the steering column 384. A lever 390 extends from the sensor 88 and a linkage member 392 couples the lever 390 with the steering arm 382. Because the lever 390 pivots with the movement of the steering arm 382, the steering position sensor 88 senses an angular position of the steering shaft 380. The sensed signal is set to the ECU 86 through a signal line 396.

The throttle lever 52 on the handlebar 48 is connected to a pulley 400 affixed to a shaft of a throttle lever position sensor 402 through a throttle wire 404. This throttle position sensor 402 is not affixed to the throttle valve shafts 94 but rather is separately provided for remotely sensing a position of the throttle lever 52. The sensed signal is sent to the ECU 86 through a signal line 406. Because the throttle valves 54 desirably are controlled by the throttle lever 52, the position of the throttle valves 54 should generally correspond to the position of this lever 52. A return spring 408 is provided at the throttle position sensor 402 so as to return the shaft of the position sensor 402 to an initial position unless the rider operates the throttle lever 52.

The control system 34A employs another engine output control mechanism 130E. This control mechanism 130E includes an electric motor 412 having a motor shaft 414. A first gear 416 is coupled with the motor shaft 414 via a clutch 418. Unless the clutch 418 is activated, the motor 412 does not rotate the first gear 416 and the first gear 416 merely idles. The first gear 414 meshes with a second gear 420 that in turn is coupled to a second shaft 422. Because a diameter of the second gear 420 is larger than a diameter of the first gear 414, a rotational speed of the second shaft 422 will be reduced relative to the rotational speed of the motor shaft 414.

A pulley 426 is affixed to the second shaft 422. The throttle bodies 110 (schematically illustrated in FIG. 22) also have a pulley 424 that actuates the throttle shafts. An actuator cable 426 connects together the pulleys 422, 424. A return spring 428 is affixed to one end of the second shaft 422 so as to return the first and second gears 416, 420 to their initial positions unless the clutch 418 is connected. A position sensor 430 is affixed to the other end of the reduction shaft 422 to sense an angular position of the shaft 422. The position sensor 430 sends a signal, which is indicative of the angular position of the shaft 422, to the ECU 86 through a signal line 432 for feedback control of the clutch 418 and/or the motor 412. The signal sensed by the position sensor 430 corresponds to the position of the throttle valves 54.

The position sensor 430 as well as the throttle lever position sensor 402 can be any type of angular position sensors such as a potentiometer type like the sensor 90 used in the preceding embodiments or a Hall IC type sensor.

The ECU 86 controls the motor 412 through a control line 434. A pulse width modulator or power amplifier 436 preferably is provided between the ECU 86 and the motor 412 to directly control the motor 412.

The ECU 86 also controls the clutch 418 through a control line 438. A switch 440, e.g., FET switch, preferably is provided between the ECU 86 and the clutch 418 to actuate the clutch 418. When a power switch, i.e., main switch, of the watercraft 30 is off, the ECU 86 is off and the switch 440 is disconnected. In the event of malfunction of the motor 412, the switch 440 is biased off and accordingly the clutch 418 is disconnected so that the throttle valves 54 can be manually operated.

The ECU 86 has a ROM to store at least a reference position of the steering shaft 380 and also has a RAM to store at least a current position signal of the throttle lever 52 and a change rate of the position signal. The ECU 86 also has a timer.

FIG. 23 illustrates a control routine of the control system 34A. The control routine starts at Step S21 when the rider turns on the main power switch. At Step S22, the ECU initializes stored data of the RAM and proceeds to Step S23. The timer starts to count time ($T_0$) at Step S23. At Step S24, the ECU 86 determines a closed position of the throttle valves 54 from the signal of the throttle valve position sensor 430. The ECU then determines whether the time ($T_0$) counted by the timer exceeds 0.25 seconds (Step S25). If 0.25 seconds has not elapsed, the ECU returns to Step S24 to repeat this step. If the time has elapsed, the ECU instructs the switch 440 to connect the clutch 418 (Step S26). Steps S21 through S26 comprise an initializing phase of the routine and are not repeated until engine is stopped and restarted.

At Step S27, the ECU 86 reads a current throttle lever position from the signal sensed by the throttle lever position sensor 402. The ECU then calculates the rate of change of the throttle lever position (Step S28). If the rate of change is zero, the rider wants to maintain the current throttle position. A large rate of change indicates quick movement of the throttle lever (e.g., when accelerating from rest) and a small rate of change indicates slow movement of the throttle lever (e.g., when docking the watercraft at which time the rider may more precisely control the throttle lever for slow speed maneuvering).

The ECU 86 then determines (at Step S29) whether the closed position of the throttle valves, which was read and stored into memory at Step S24, falls within a range defined between a reference upper limit (RUL) and a reference lower limit (RLL). If it does, the ECU proceeds to Step S31. If not, the ECU performs Step S30.

At the step S30, the ECU 86 selects either the reference upper limit (RUL) or the reference lower limit (RLL) as a hypothetical closed position. For example, the ECU may be programmed to determine which one of the RUL or RLL is closer to measured value, and then use the closest one as the hypothetical closed position. The ECU then proceeds to the Step 31.

At Step S31, the ECU 86 determines whether the engine 32 is in an idle state, i.e., whether the throttle valves 54 are closed. This determination uses either the actual closed position sensed by the throttle valve position sensor 430 or the hypothetical closed position replaced at the step S30, depending upon the conclusion reached at Step S29. The idle engine speed of the engine 32 is, for example, 1,200 rpm. If the engine is operating above idle, the ECU proceeds to Step S39 to instruct the pulse width modulator 436 to practice a normal control mode for controlling the throttle drive motor 412. If, however, the engine is at idle, the ECU proceeds to Step S32.

The pulse width modulator 436 practices the following two controls at the step S39. The first control (i.e., Control (1)) involves bringing the actual throttle opening degree sensed by the throttle valve position sensor 430 close to the desired throttle opening sensed by the throttle lever position sensor 402. For this purpose, any deviation between these two sensed values preferably is minimized to the extent possible by actuating the motor 412 to move the throttle valves.

The second control (i.e., Control (2)) involves controlling the motor 412 through the pulse width modulator 436 in response to the change rate calculated at Step S28. If the rate of change is large, the modulator 436 supplies the motor 412 with a relatively high power level so that the motor 412 rotates at a relatively high speed. If the rate of change is small, then the modulator 436 supplies the motor 412 with a relatively low power level so that the motor 412 rotates at a relatively low speed. After performing Step S39, the program returns to Step S27.

If the ECU determines that the throttle valves are closed (Step S31), the ECU 86 then determines at Step S32 whether the steering position sensed by the steering position sensor 88 is greater than a reference steering position (RS). If no, the ECU does not begin its engine output control mode and proceeds to control the modulator 436 in its normal manner (Step S39). If, however, the sensed steering position is greater than the reference steering position (RS), i.e., the rider has turned the steering bar 48 by more than a predetermined degree, the ECU proceeds to Step S33 for a further calculation before deciding whether to begin its engine output control mode.

The ECU 86 at Step S33 determines whether the throttle valve opening, and consequently the engine output, is increasing. The assessment of this situation can be determined from whether the actual throttle opening degree is increasing from the closed position under the rider's own control. If yes, the program proceeds to Step S39. If not, the ECU begins its engine output control mode (Step S34). This step S33 is advantageous if a manual control or an independent control of the throttle valves is employed. This step S33, however, can be omitted in the illustrated control system 34A.

At Step S34, the ECU 86 instructs the pulse width modulator 436 to drive the motor 412 in a direction that increases the throttle valve opening degree. Under this control, the throttle valves are opened to a predetermined throttle opening that corresponds with a desired engine speed. In the illustrated embodiment, the engine speed preferably is increased to 3,000 rpm. The desired engine speed preferably is sufficient to effect sharp turning of the watercraft. The ECU 86 then starts the timer (Step S35) to count off a predetermined amount of time (i.e., starts a count down).

At Step S36, the ECU 86 determines whether the throttle lever position is greater than the idle position. If yes, the rider is operating the throttle lever 52 to increase the engine output and the program proceeds to Step S38 to stop the engine output control mode. If no, the ECU proceeds to Step S37.

At Step S37, the ECU determines whether the timer has finished the count down. The time period of this count down preferably is about 3 seconds. If this time has not elapsed, the ECU repeats Step S36. If the time has expired, the ECU ceases the engine output control mode (Step S38), and returns to the main control routine at Step S27.

Although this engine control system has been described in terms of certain preferred embodiments, other embodiments and variations of the foregoing examples will be readily apparent to those of ordinary skill in the art. For example, the output of the throttle valve position sensor in the described embodiments can be directly or indirectly used as a control parameter of the ECU. That is, for example, a sensed throttle opening degree, an absolute value of the sensed opening degree, an increase or decrease amount of the opening degree and a rate of change of the opening degree can all be used as the control parameter(s).

Additionally, the output of the steering position sensor can be directly or indirectly used as another control parameter of the ECU. That is, for example, a sensed angular position, an absolute value of the sensed angular position, an increase or decrease amount of the angular position and a rate of change of the angular position are all applicable as the control parameter(s).

The output of the velocity sensor can be directly or indirectly used as a further control parameter of the ECU. That is, for example, a sensed velocity, an absolute value of the velocity, an increase or decrease amount of the velocity and a change rate of the velocity are all applicable as the control parameter.

The sensors can be positioned not only in close proximity to thing that they are measuring but also at a remote place. If the sensors are remotely disposed, an appropriate mechanical, electrical or optical linkage mechanism can be applied.

Conventional sensors are all applicable as the sensor described above whether they are given as examples or not. Additionally, conventional actuators using, for example, electrical power or fluid power (e.g., air pressure, water pressure or hydraulic oil pressure) are all applicable as the actuator for the engine output control whether they are exemplified or not.

Accordingly, the foregoing description is that of preferred embodiments of the present invention, and various changes and modifications may be made without departing from the spirit and scope of the invention, as defined by the appended claims.

What is claimed is:

1. A watercraft comprising a water propulsion device, an engine powering the water propulsion device, an engine output control mechanism arranged to control the output of the engine, a steering mechanism arranged to steer the watercraft, a first sensor arranged to sense a state of the engine output control mechanism, a second sensor arranged to sense a state of the steering mechanism, and a control device configured to control the engine output control mechanism based upon a first control parameter corresponding to an output of the first sensor and a second control parameter corresponding to an output of the second sensor, the control device being configured to cause the engine output control mechanism to increase engine output in a predetermined gradual or step by step manner when the first control parameter is less than a first reference magnitude and the second control parameter is greater than a second reference magnitude.

2. The watercraft of claim 1, wherein the control device is configured to control the engine output control mechanism until the first control parameter reaches an objective magnitude.

3. The watercraft as set forth in claim 2, wherein the control device is configured to cease control of the engine output control mechanism when the first control parameter satisfies a first reference condition or the second parameter satisfies a second reference condition.

4. The watercraft as set forth in claim 2, wherein the control device includes a timer, and the control device is configured to cease control of the engine output control mechanism when a predetermined time elapses.

5. The watercraft as set forth in claim 1, wherein the water propulsion device includes an impeller driven by the engine for producing a thrust force, the control device is configured to control the engine output control mechanism to increases the engine output to a magnitude where the impeller rotates with a rotational speed that is greater than a critical rotational speed thereby the watercraft starts planing.

6. The watercraft as set forth in claim 1, wherein the engine has at least one combustion chamber and an air induction system arranged to provide air to the combustion chamber, the engine output control mechanism includes a throttle valve disposed in the air induction system for measuring an amount of the air, the first sensor is arranged to sense an opening degree of the throttle valve, and the control device controls the throttle valve to increase the opening degree of the throttle valve when the sensed opening degree is less than a reference opening degree and the second control parameter is greater than the second reference magnitude.

7. The watercraft as set forth in claim 6, wherein the throttle valve continues to open until an opening degree thereof reaches an objective opening degree under the coercion control of the control device.

8. The watercraft as set forth in claim 7, wherein the control device ceases the coercion control of the engine output control mechanism when the sensed opening degree increases to the objective opening degree.

9. The watercraft as set forth in claim 6, wherein the engine output control mechanism includes an electrically operated actuator, and the control device controls the throttle valve through the actuator.

10. The watercraft as set forth in claim 9, wherein the throttle valve is journaled for pivotal movement about a pivot axis, the first sensor is positioned on one end of the pivot axis and the actuator is positioned on the other end of the pivot axis.

11. The watercraft as set forth in claim 1, wherein the engine has at least one combustion chamber and an air induction system arranged to provide air to the combustion chamber, the engine output control mechanism includes a throttle valve disposed in the air induction system for measuring an amount of the air, and a throttle controller disposed apart from the air induction system to remotely control a position of the throttle valve, the first sensor is arranged to sense a position of the throttle valve or a position of the throttle controller.

12. The watercraft as set forth in claim 1, wherein the steering mechanism includes a steering assembly and a deflector disposed at the water propulsion device, the steering assembly and the deflector are linked together, and the second sensor is arranged to sense an angular position of the steering assembly or the deflector, the control device controls the engine output control mechanism to increase the engine output when the sensed angular position of the steering assembly or the deflector is greater than a reference angular position and the first control parameter is less than the first control parameter.

13. The watercraft as set forth in claim 12, wherein the control device ceases the coercion control when the sensed angular position becomes generally zero.

14. The watercraft as set forth in claim 1, wherein the engine includes an ignition system arranged to ignite a combustible charge in a combustion chamber of the engine, and the control device controls the engine output control mechanism to advance an ignition timing of the ignition system to increase the engine output.

15. The watercraft as set forth in claim 1, wherein the engine includes a fuel delivery system arranged to deliver fuel to a combustion chamber of the engine, and the control device controls the engine output control mechanism to increase an amount of the fuel to increase the engine output.

16. The watercraft as set forth in claim 1, wherein the engine includes a fuel injection system arranged to spray fuel to a combustion chamber of the engine, and the control device controls the engine output control mechanism to advance an injection timing to increase the engine output.

17. The watercraft as set forth in claim 1, wherein the control device is configured to control of the engine output control mechanism so that a thrust force of the water propulsion device continues to be greater than a reference thrust force thereof.

18. The watercraft as set forth in claim 1 additionally comprising a third sensor arranged to sense a velocity of the watercraft, the control device configured to control the engine output mechanism additionally based upon a third control parameter corresponding to an output of the third sensor, and the control device is configured to control the engine output control mechanism to increase the engine output unless the third control parameter is less than a third reference magnitude.

19. The watercraft as set forth in claim 1, wherein the water propulsion device includes a jet unit producing thrust force.

20. The watercraft as set forth in claim 1 additionally comprising a switchover mechanism selectively activating and disabling the control device.

21. A The watercraft as set forth in claim 20, wherein the switchover mechanism has a first state in which the engine is operable and the control device is activated, a second state in which the engine is operable and the control device is disabled, and a third state in which the engine is not operable and the control device is disabled.

22. A watercraft comprising a water propulsion device, an engine powering the water propulsion device, an engine output control mechanism arranged to control the output of the engine, a steering mechanism arranged to steer the watercraft, a first sensor arranged to sense a state of the engine output control mechanism, a second sensor arranged to sense a state of the steering mechanism, and a control device configured to control the engine output control mechanism based upon a first control parameter corresponding to an output of the first sensor and a second control parameter corresponding to an output of the second sensor, the control device configured to cause the engine output control mechanism to increase engine output when the first control parameter is less than a first reference magnitude and the second control parameter is greater than a second reference magnitude, wherein the engine has at least one combustion chamber and an air induction system arranged to provide air to the combustion chamber, the engine output control mechanism includes a throttle valve disposed in the air induction system for metering an amount of the air flowing through the induction system, the first sensor is arranged to sense an opening degree of the throttle valve, a bypass disposed in the air induction system configured to permit a sufficient amount of the air to bypass the throttle valve to turn the watercraft at a planning speed, and a bypass valve arranged to control the air passing through the bypass, the control device controls the bypass valve to increase the amount of the air so as to increase the engine output.

23. A watercraft comprising a water propulsion device including a jet unit configured to produce a thrust force, an engine powering the water propulsion device, an engine output control mechanism arranged to control the output of the engine, a steering mechanism arranged to steer the watercraft, a first sensor arranged to sense a state of the engine output control mechanism, a second sensor arranged to sense a state of the steering mechanism, a control device configured to control the engine output control mechanism based upon a first control parameter corresponding to an output of the first sensor and a second control parameter corresponding to an output of the second sensor, the control device configured to cause the engine output control mechanism to increase engine output when the first control parameter is less than a first reference magnitude and the second control parameter is greater than a second reference magnitude, wherein the jet unit includes a discharge nozzle from which water is discharged and a trim adjustment mechanism arranged to adjust a trim position of the discharge nozzle, the trim adjustment mechanism also being configured to bring the discharge nozzle into a trim down position when the control device controls the engine output control mechanism to increase the engine output.

24. The watercraft as set forth in claim 23, wherein the control device controls the trim adjustment mechanism.

25. A watercraft comprising a water propulsion device, an engine powering the water propulsion device, an engine output control mechanism arranged to control the output of the engine, a steering mechanism arranged to steer the watercraft, a first sensor arranged to sense a state of the engine output control mechanism, a second sensor arranged to sense a state of the steering mechanism, a control device configured to control the engine output control mechanism based upon a first control parameter corresponding to an output of the first sensor and a second control parameter corresponding to an output of the second sensor, the control device configured to cause the engine output control mechanism to increase engine output when the first control parameter is less than a first reference magnitude and the second control parameter is greater than a second reference magnitude, a switchover mechanism selectively activating and disabling the control device, wherein the switchover mechanism has a first state in which the engine is operable and the control device is activated, a second state in which the engine is operable and the control device is disabled, and a third state in which the engine is not operable and the control device is disabled, wherein the switchover mechanism includes a first holder to hold the switchover mechanism in the first state or in the third state, a second holder to hold the switchover mechanism in the second state or in the third state, and the first and second holder is selectively available.

26. The watercraft as set forth in claim 25, wherein the first and second holders are lanyard switch members.

27. A watercraft comprising a water propulsion device, an engine powering the water propulsion device, an engine output control mechanism arranged to control output of the engine, a steering mechanism, a first sensor arranged to sense a state of the steering mechanism, a second sensor arranged to sense a velocity of the watercraft, and a control device configured to control the engine output control mechanism based upon a first control parameter corresponding to an output of the first sensor and a second control parameter corresponding to an output of the second sensor, the control device causing the engine output control mechanism to increase engine output when the first control parameter is greater than a first reference magnitude and the second control parameter is greater than a second reference magnitude, a switchover mechanism configured to allow an operator to selectively activate and disable the control device, the switchover mechanism having a first state in which the engine is operable and the control device is activated, a second state in which the engine is operable and the control device is disabled, and a third state in which the engine is not operable and the control device is disabled, the switchover mechanism including a first holder to hold the switchover mechanism in the first state or in the third state, a second holder to hold the switchover mechanism in the second state or in the third state, and the first and second holder is selectively available.

28. A watercraft comprising a water propulsion device, an engine powering the water propulsion device, a steering mechanism arranged to steer a thrust direction of the water propulsion device, the thrust direction being quickly changeable under a first condition when the water propulsion device produces a thrust force greater than a predetermined thrust force, recognizing means for recognizing that the steering mechanism is steered under a second condition in which the water propulsion device does not produce a thrust force greater than the predetermined thrust force, means for increasing an output of the engine when the recognizing means recognizes that the steering mechanism is steered under the second condition and means for allowing an operator to activate and de-activate the means for increasing.

29. The watercraft as set forth in claim 28, wherein the increasing means ceases increasing of the output of the engine when the steering mechanism is back in a neutral position where the thrust direction of the water propulsion device is not steered.

30. The watercraft as set forth in claim 28, wherein the increasing means ceases increasing of the output of the engine when a predetermined time elapses.

31. A control method for an engine of a watercraft having a water propulsion device, an engine output control mechanism, a steering mechanism, at least two sensors and a control device, the method comprising sensing a state of the engine output control mechanism by one sensor, sensing a state of the steering mechanism by another sensor, determining whether a first control parameter corresponding to a sensed state of the engine output is less than a first reference magnitude, determining whether a second control parameter corresponding to a sensed state of the steering mechanism is greater than a second reference magnitude, and increasing an engine output in a predetermined gradual or a step by step manner by the control device if the results of both determinations are affirmative.

32. The control method as set forth in claim 31 additionally comprising judging whether the first control parameter satisfies a first reference condition, judging whether the second control parameter satisfies a second reference condition, and ceasing the increase of the engine output if at least one of results of the judgments is affirmative.

33. The control method as set forth in claim 31 additionally comprising setting a predetermined time, judging whether the predetermined time elapses, and ceasing the increase of the engine output if the time elapses.

34. A watercraft comprising a water propulsion device, an engine powering the water propulsion device, a first induction passage, an engine output control mechanism configured to control an amount of air delivered to the engine through the first induction passage, a steering mechanism arranged to steer the watercraft, and an air bypass assembly configured to allow a sufficient amount of air to bypass the control mechanism to operate at a speed sufficient to turn the watercraft at a planing speed.

35. The watercraft as set forth in claim 34, wherein the air bypass assembly comprises an air bypass passage and an air bypass valve.

36. The watercraft as set forth in claim 34 additionally comprising a controller configured to control the engine output control device and the air bypass assembly, wherein the water propulsion device includes an impeller driven by the engine for producing a thrust force, the air bypass assembly being configured to increase the engine output to a magnitude where the impeller rotates with a rotational speed sufficient to turn the watercraft at a planning speed.

37. The watercraft as set forth in claim 36, wherein the bypass assembly is configured to increase the engine output in a predetermined gradual or step by step manner.

38. A method for controlling an engine of a watercraft having a water propulsion device, an engine output control mechanism configured to control an amount of air flowing through a first induction passage into the engine, a steering mechanism, at least two sensors and an air bypass valve, the method comprising sensing a state of the engine output control mechanism with one sensor, sensing a state of the steering mechanism with another sensor, determining whether a first control parameter corresponding to a sensed state of the engine output is less than a first reference magnitude, determining whether a state of the steering mechanism is greater than a second reference magnitude, and increasing an engine output with the air bypass valve to a magnitude sufficient to turn the watercraft if the results of both determinations are affirmative.

39. The control method as set forth in claim 38, additionally comprising judging whether the first control parameter satisfies a first reference condition, judging whether the state of the steering mechanism satisfies a second reference condition, and ceasing the increase of the engine output if at least one of results of the judgments is affirmative.

40. The control method as set forth in claim 38, additionally comprising setting a predetermined time, judging whether the predetermined time elapses, and ceasing the increase of the engine output if the time elapses.

* * * * *